(12) United States Patent
Ray

(10) Patent No.: US 6,311,228 B1
(45) Date of Patent: Oct. 30, 2001

(54) METHOD AND ARCHITECTURE FOR SIMPLIFIED COMMUNICATIONS WITH HID DEVICES

(75) Inventor: Kenneth D. Ray, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 08/907,200

(22) Filed: Aug. 6, 1997

(51) Int. Cl.[7] ................................................. G06F 15/163
(52) U.S. Cl. ............................................................ 709/321
(58) Field of Search ................................... 709/301, 303, 709/300, 321, 310; 395/600, 205; 370/401

(56) References Cited

U.S. PATENT DOCUMENTS

| | | | |
|---|---|---|---|
| 5,265,252 | * 11/1993 | Rawson, III et al. | 709/326 |
| 5,375,241 | * 12/1994 | Walsh | 709/331 |
| 5,465,364 | * 11/1995 | Lathrop et al. | 709/321 |
| 5,475,836 | * 12/1995 | Harris et al. | 707/1 |
| 5,581,461 | * 12/1996 | Coll et al. | 705/5 |
| 5,612,957 | * 3/1997 | Gregerson et al. | 370/401 |
| 5,727,212 | * 3/1998 | Dinallo | 709/321 |
| 5,926,636 | * 7/1999 | Lam et al. | 709/313 |
| 5,974,234 | * 10/1999 | Levine et al. | 358/1.16 |
| 6,014,511 | * 1/2000 | Krithivas et al. | 703/26 |
| 6,085,265 | * 7/2000 | Kou | 710/63 |

FOREIGN PATENT DOCUMENTS

2258067 A * 1/1993 (GB) .

OTHER PUBLICATIONS

Universal Serial Bus (USB) Device Class Definition for Human Interface Devices (HID); Firmware Specification; Version 1.0, Jan. 1997.*
Writing Device Drivers:Tutorial: by DEC OSF/1 Version 3.0 or higher, Chapters 1–2 (Sections 2.40), Aug. 1994.*

* cited by examiner

Primary Examiner—Kenneth R. Coulter
(74) Attorney, Agent, or Firm—Lee & Hayes, PLLC

(57) ABSTRACT

A computer system in accordance with the invention includes a USB transport layer and an HID class driver implemented on top of the transport layer. A client program calls the class driver (either directly or indirectly) to obtain HID reports and report descriptors. Before returning the reports to calling programs, however, the HID class driver normalizes the reports by making them a uniform length and by adding report IDs to any reports that do not already have report IDs. A provided parser includes a descriptor parsing function and an item retrieval function. After obtaining a report descriptor, a client calls the descriptor parsing function with the report descriptor as an argument. The descriptor parsing function returns a data structure containing a parsed report description. The client stores the parsed report description and submits it, along with HID reports, to the item retrieval function. A particular usage specification is also provided as an argument to the item retrieval function. The item retrieval function searches the designated HID report, based on the parsed report description, and returns one or more data items from the report whose usage specifications match the usage specification submitted as an argument to the item retrieval function.

55 Claims, 7 Drawing Sheets

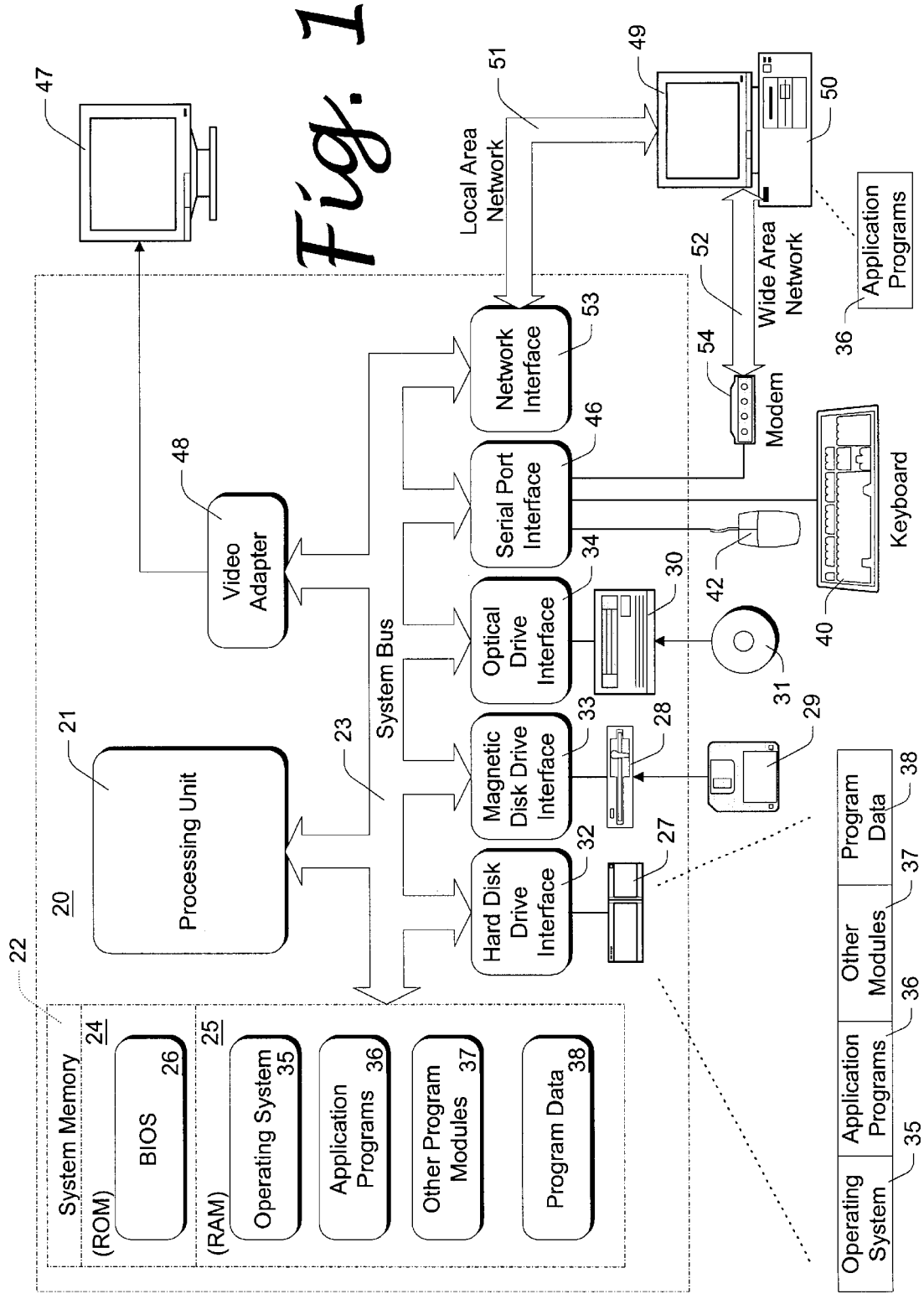

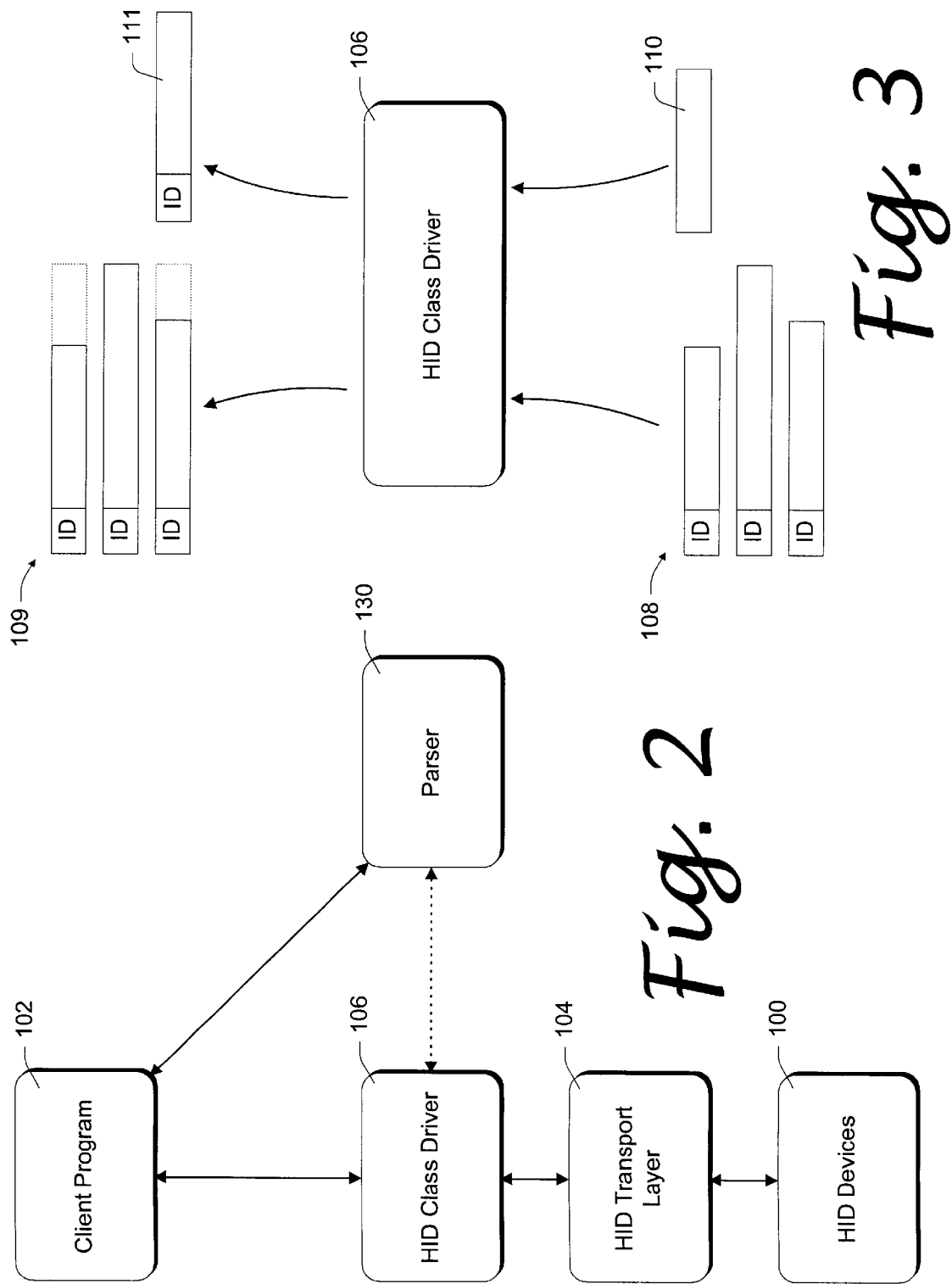

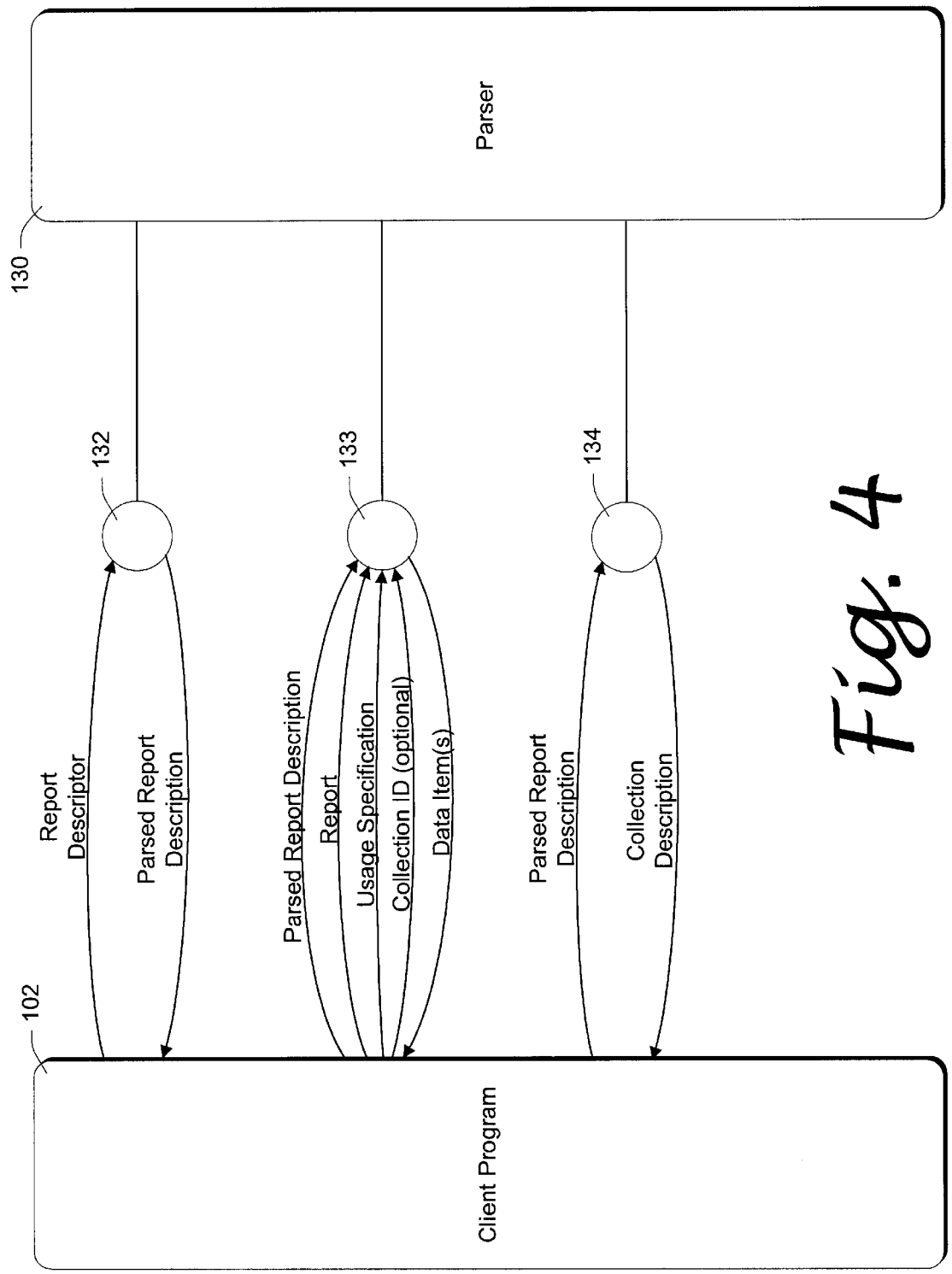

METHOD AND ARCHITECTURE FOR SIMPLIFIED COMMUNICATIONS WITH HID DEVICES

TECHNICAL FIELD

This invention relates to drivers for operation in conjunction with Human Interface Devices, and to methods of reading from and writing to such drivers and devices.

BACKGROUND OF THE INVENTION

Universal Serial Bus (USB) is a communications architecture that gives a personal computer the ability to interconnect with a variety of devices using a simple four-wire cable. USB protocols can configure devices at startup or when they are plugged in at run time. These devices are broken into various device classes. Each device class defines the common behavior and protocols for devices that server similar functions.

The invention described below is used in conjunction with the Human Interface Device (HID) class. The HID class consists primarily of devices (referred to herein as HID devices or as HID class devices) that are used by humans to control the operation of computer systems. Typical examples of HID class devices include:

Keyboards and pointing devices—for example, standard mouse devices, trackballs, and joysticks.

Front-panel controls—for example: knobs, switches, buttons, and sliders.

Controls that might be found on devices such as telephones, VCR remote controls, games or simulation devices—for example: data gloves, throttles, steering wheels, and rudder pedals.

Devices that may not require human interaction but provide data in a similar format to HID class devices— for example, bar-code readers, thermometers, or voltmeters.

The current HID specification, which is hereby incorporated by reference, is promulgated by a non-profit organization referred to as the USB—IF and is available from that organization which is located in Hillsboro, Oreg. The specification can also be accessed through the Internet at www.usb.org. The HID specification is likely to evolve, although its most significant characteristics are fairly well defined and accepted at this time.

One well-defined and accepted characteristic of HID devices, with which this invention is primarily concerned, is that such devices transmit and receive data in data packages called "reports." Devices are given a great deal of flexibility in formatting such reports.

Reports contain two different types of data generated by HID devices: buttons and values—generically referred to herein as data items. Each data item is generated by a control, such as a key, a slider, a single axis of a joystick, etc. A button-type data item is binary, having one of two values: 0 or 1. Button-type data items are generated by such things as keys or switches. A value-type data item has a range of values, usually indicating an analog position of a continuously-variable control such as a slider, joystick axis, or throttle. Although HID devices usually generate input data items, reports can also be received by HID devices, enabling a computer to control LED, speaker volumes, and other output devices on an HID device.

Each control has an associated "usage," specified by the HID device manufacturer. Usages supply computer application programs with information about parameters being measured by different controls and what should be done with the data items generated by the controls—for example, X, Y, and Z input. The HID specification itself includes usage definitions for a number of different devices, such as keyboards, joysticks, sliders, and other devices.

An HID usage contains two components: a usage page and a usage index. The usage page corresponds to a particular device. Probably the most common usage pages are the "generic desktop" page and the "keyboard" page. Usage indexes correspond to specific controls within the page, such as joystick keys, axes, sliders, keyboard keys, etc.

In practice, the term "usage" sometimes refers to a usage index. In the main body of this document (excluding the section, "Windows NT HID Client Design Guide"), however, "usage" refers to a pair of values comprising a usage page and a usage index. The term "usage specification" is used herein to refer more generally to either one or both components of a usage.

As already mentioned, the arrangement and formatting of HID reports varies tremendously from device to device. Generally, each report contains a plurality of data items occurring in an arbitrary order specified by the device, wherein each data item has an arbitrary number of bits and an arbitrary bit alignment within a report. Furthermore, data items themselves can be reported in different formats, such as bit field formats and index array formats.

A device can also separate its data items into two or more reports, in which case each report begins with a report ID. The reports themselves are of various, non-uniform lengths, and are generated by the HID device only when a data item contained in the report changes.

In addition, a device can group various controls into different "collections," wherein each collection has its own specified usage. Collections can span different reports. Collections can also be nested within each other. Data items corresponding to the same usage can be reported in different collections.

Each HID device generates an HID report descriptor that specifies the reports generated by the device. For each report, the report descriptor describes the arrangement and formatting of the data items contained in the report, as well as the usages associated with each data item.

HID report descriptors are coded using a sophisticated protocol. Any application program that uses HID report data must first parse the associated report descriptor to determine how to interpret individual reports, and how to find data items within reports. Parsing a report descriptor is an extremely complex task.

The HID protocol described above is very efficient in terms of bandwidth. In addition, it is fairly simple to implement in HID devices. However, the scheme presents a number of difficulties for application program developers. These difficulties relate primarily to the flexibility allowed in HID reports and to the complexity of the HID report descriptors.

Writing an application program for a single, known HID device is not difficult. In this case, the developer knows, ahead of time, the exact nature of all available data items and how they are arranged and formatted within HID reports.

Difficulties arise, however, when attempting to write a program for use with different peripherals, all of which potentially implement their reports in different and unforeseeable ways. One peripheral might utilize only a single report, while another might divide its data items into two or three reports. One keyboard might report keystrokes as bit fields, while another might utilize an index array. One joystick might have only very basic controls, while another might provide more sophisticated controls like a hatswitch and airplane yoke controls. Even the sizes of reports are different from peripheral to peripheral, making it difficult to determine required buffer sizes. Collections, similarly, can be implemented quite differently in different peripherals.

Although all of this information is available from the report descriptor, parsing the information is quite difficult-buffering and parsing the actual reports is similarly quite complicated when such a variety of formats must be accommodated.

Thus, although HID technology has the potential of making a variety of devices or peripherals compatible with a given application program, such compatibility can presently be realized only with very significant investment in the development of the application program, so that the application program can adapt to the various report formats available to HID peripherals.

SUMMARY OF THE INVENTION

The invention includes a method and architecture that allows client programs to receive HID data items in a consistent manner, regardless of the originating HID device and without requiring the client programs to perform sophisticated parsing. In the exemplary embodiment, the architecture includes a transport layer from which HID reports and report descriptors are available, and to which they can be written. An HID class driver is implemented on top of the transport layer. Client programs, including application programs and operating system components, interface with HID devices through the HID class driver.

In accordance with one aspect of the invention, the HID class driver adds report IDs to all reports that do not already contain report IDs. This step adds consistency to HID reports, making them easier to read and parse. In addition, the HID class driver determines the largest report generated by an HID device, and pads all other reports from that HID device so that all reports from a given device are a uniform length. This again adds consistency, making it easier for consuming applications to buffer and parse reports. In accordance with another aspect of the invention, a set of interfaces enables client programs to request data items specified only by their usages.

During an initialization phase, the client program retrieves a report descriptor from the class driver, through a normal file I/O call. It then submits this report descriptor to a parser, which parses the report descriptor and returns a data structure containing a parsed report description. When attempting to read HID data items, the client program first retrieves an HID report from the class driver. It then calls an interface function with arguments that include the HID report, the data structure containing the parsed report description, and a usage specification (such as a usage page and a usage index). The interface function searches the HID report for data item associated with the specified usage, using the parsed report description as an index into the HID report, and returns the data item to the requesting client if the data item is found in the report. A collection identifier can optionally be specified in the arguments to the interface function, in which case the interface function limits the returned data values to those in an HID collection specified by the collection identifier.

BRIEF DESCRIPTION OF THE DRAWINGS

FIG. 1 is a block diagram of an exemplary operating environment for the invention.

FIG. 2 is a block diagram showing an HID data communications system and architecture in accordance with the invention.

FIG. 3 is a block diagram illustrating HID report normalization in accordance with the invention.

FIG. 4 is a block diagram illustrating parser interface functions in accordance with the invention.

DETAILED DESCRIPTION

Exemplary Operating Environment

Figure 5:
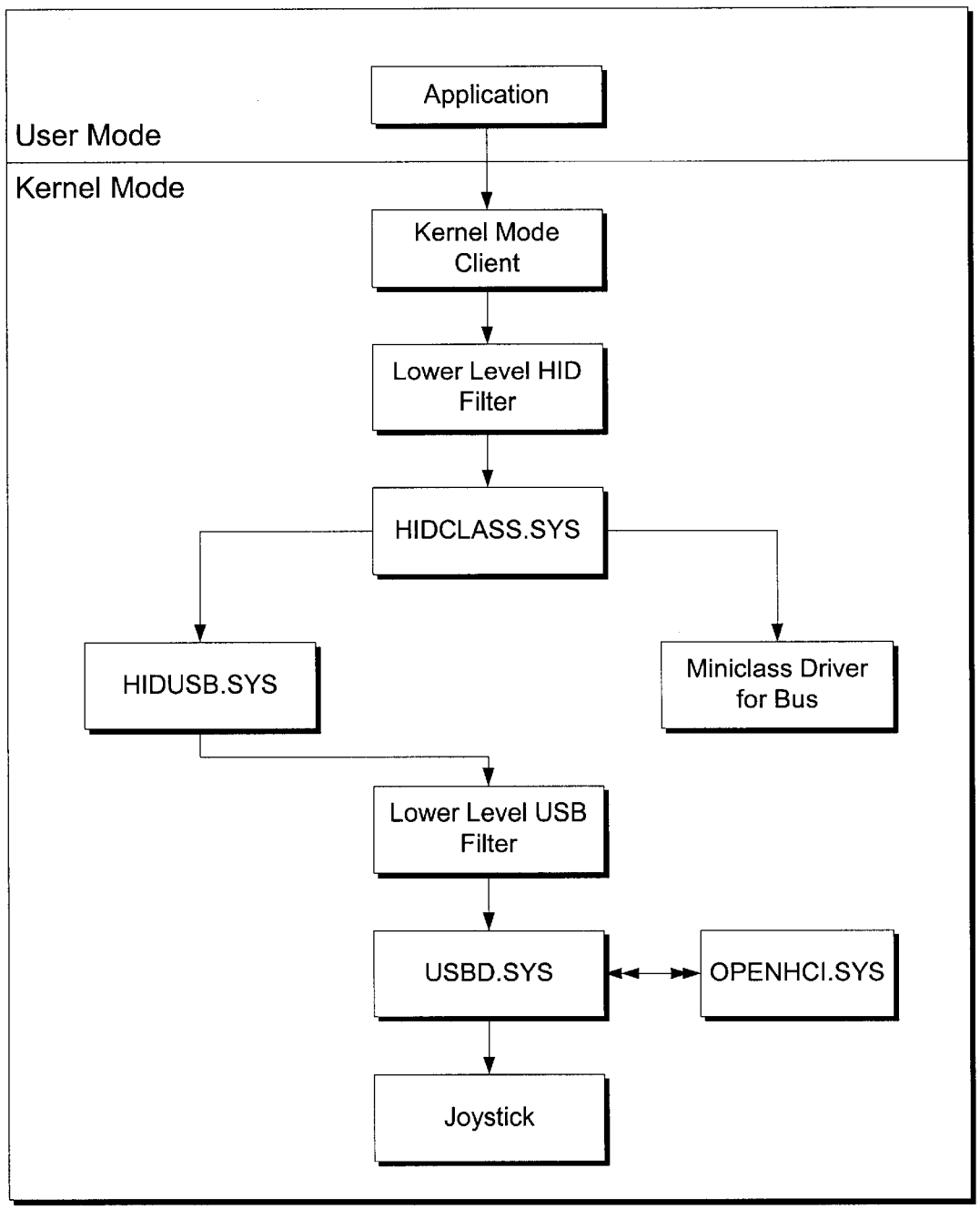
FIG. 5 is a block diagram illustrating an HID joystick with a kernel mode client.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, interfaces, interface functions, etc. stored in computer-readable memory. When executed, these modules perform particular tasks, implement particular abstract data types, and expose or implement various interfaces and interface functions. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by remote processing devices that are linked through a communications network. In a distributed computer environment, program modules may be located in both local and remote memory storage devices.

With reference to FIG. 1, an exemplary system for implementing the invention includes a general purpose computing device in the form of a conventional personal computer or computer system 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable-media which can store data that is accessible by a computer, such as magnetic cassettes, flash memory cards, digital video disks, Bernoulli cartridges, random access memories (RAMs) read only memories (ROM), and the like, may also be used in the exemplary operating environment.

A number of program modules may be stored on the hard disk, magnetic disk 29 optical disk 31, ROM 24, or RAM 25, including an operating system 35, one or more application programs 36, other program modules 37, and program data 38. A user may enter commands and information into the personal computer 20 through input devices such as keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, personal computers typically include other peripheral output devices (not shown) such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The illustrated computer uses an operating system such as the Windows family of operating systems available from Microsoft Corporation. The functionality described below is implemented using standard programming techniques, including the use of OLE and COM interfaces and interface functions such as described in Brockschmidt, Kraig; *Inside OLE* 2; Microsoft Press, 1994, which is hereby incorporated by reference.

General Architecture

FIG. 2 shows components implemented within computer 20 for providing communications between HID devices 100 and client programs such as client program 102 shown. As used herein the term "HID device" means any device that communicates with computer components using the HID protocol in its current or any revised forms. A client program is any program or program component, including operating system components, that is a consumer of HID data items.

In accordance with FIG. 2, a transport layer or driver stack 104, including one or more USB device drivers, provides low-level communications with HID devices in accordance with USB standards and protocols. An HID class driver 106 is implemented on top of transport layer 104, creating the functional device object which controls the physical device object enumerated by the transport layer (such as the USB device driver stack). Driver stack 104 provides HID reports as well as HID report descriptors describing the HID reports. The HID reports, as described in the "Background" section of this document, are of different sizes and contain data items corresponding to controls implemented in HID devices. The HID report descriptors specify the arrangement, formatting, and usage specifications of data items within the HID reports. The HID class driver 106 is configured to request and receive the HID reports and the HID report descriptors from the USB device driver.

Operating system clients can call the HID class driver to read HID reports and report descriptors from HID devices, as well as other types of data provided by HID devices. Such components can also write to HID devices by providing appropriately formatted reports. Application program clients also communicate with HID devices through the HID class driver, although only indirectly—application programs actually communicate with HID devices by making file I/O calls through the computer operating system, which in turn communicates directly with the HID class driver.

Report Normalization

HID class driver 106 is implemented generally in accordance with conventional techniques, except for the significant improvement of normalizing all HID reports before providing them to client programs. One way this normalization is accomplished is by adding an HID report ID to any report that does not already have a report ID. In accordance with the HID specification, reports are only required to have report IDs when there is more than one report originating from a device; when there is only one report available from a device, a report ID is optional.

As another step in normalizing HID reports, the class driver makes all reports from a given HID device a uniform size. Specifically, the class driver determines the size of the largest report generated by a particular device (including any added report ID), and pads all reports from that device so that they are equal in size to the size of the largest report.

Thus, the invention includes a method, performed by an HID class driver, of returning HID reports to requesting client programs only after normalizing them. Such a method includes steps of receiving HID reports from an HID device, and then normalizing them by padding them (with bytes having arbitrary values) to make them a uniform size.

This process is illustrated in FIG. 3. Several different reports 108, each having a different length, are retrieved from a particular HID device. Before passing them on to requesting programs, HID class driver 106 pads them so that they are all the same length. The normalized reports are referenced by number 109 in FIG. 3—the padding is indicated by dashed lines. Similarly, a single report 110 is retrieved from a different device. Report 110, as it is retrieved from the transport stack, has no report ID.

Accordingly, HID class driver 106 adds a report ID as the first byte of the report, resulting in normalized report 111.

Normalizing reports provides important advantages. One of the most significant advantages is that it allows application programs to ensure that each read from class driver 106 returns one and only HID report. Consider, for example, the situation resulting from an HID device that generates two different HID reports of different lengths. Either one of the reports can be generated at any time; a requesting client does not know which of the two reports will be next. When performing file I/O to read the next report, the client does not know (without normalization) how many bytes should be read. Thus, it is likely that either two read operations will be necessary, or that the first read operation will retrieve part the next report. This problem is eliminated with the normalization described above, since all reports are of the same length. A client may choose to read either an entire report or some integral multiple of a report length.

Similarly, ensuring that all reports begin with a report ID means that a client can expect the subsequent data to always start at a particular location.

Although the normalization procedure has been described with reference to read operations, it is also used in write operations. When writing to an HID device, a requesting client provides reports, each of which are a uniform size, with data items that are to be written to the HID device. Before the class driver writes to the device, it strips the extra length from a normalized report and removes the report ID if the device does not expect such an ID. Again, this allows client programs to utilize reports and corresponding buffers of a uniform size.

Simplified Retrieval of Data Items

The system of FIG. 2 includes a parser component 130 that provides parsing services to client programs. Parser 130 is implemented with a dynamically loadable library or "DLL." The parser and its associated functions are defined and implemented by instructions that reside in computer memory, and that are executed by the computer'processor.

The specific interfaces and interface functions of an exemplary parser in accordance with the invention are described in detail in the below section entitled "Windows NT HID Client Design Guide". The section, "Windows NT HID Client Design Guide," describes a current implementation of the invention on the Windows NT operating system. It includes a variety of functions that are implemented in the current embodiment of the invention. The functions most relevant to the invention are described functionally and conceptually herein with reference to FIG. 4.

FIG. 4 shows client program 102 and parser 130. Parser 130 defines and exposes a plurality of interface functions that are callable through conventional means by client program 102. Such functions are illustrated in FIG. 4 by circles, attached by lines to parser block 130. The functions include a descriptor parsing function 132, one or more item retrieval functions 133, and a collection identification function 134. The functions are implemented using standard programming techniques, such as programming the functions in a high-level compiled language like C. Each function accepts one or more arguments, and returns one or more values or data items to the calling program. FIG. 4 shows the arguments most pertinent to the invention. The section, "Windows NT HID Client Design Guide," sets forth more detailed specifications of function arguments and returned values, in the context of one actual embodiment of the invention.

Descriptor parsing function 132 receives function arguments that include an actual HID report descriptor, obtained from HID class driver 106. In response to being called with this argument, descriptor parsing function 132 parses the report descriptor, and creates a data structure containing a parsed report description. The data structure is returned to the client program, preferably by passing a pointer to the data structure.

In general, the data structure is an expanded version of the raw report descriptor. The data structure is generally arranged as an array of data item descriptions, corresponding to individual button-type controls, value-type controls, or arrayed data items. The data item description corresponding to a particular data item indicates which report the data item is available in, its position and size in the report, and its HID characteristics (including physical min/max, logical min/max, units, etc.). Further information in a data item description includes the usage (page and index) of the corresponding data item, whether it corresponds to a button or value, whether it is reported as an individual data item, a bit field, or part of an array, whether the item is part of a collection and if so, which collection(s), etc.

The parsed report description also indicates the maximum length of reports generated by a particular device, and whether report IDs should be added to respective reports. This information is used by HID class driver 106 to perform its normalization steps.

In short, each element of the data structure contains a complete description of a control or an array of controls. This contrasts dramatically with the raw report descriptor, in which control descriptions rely extensively on the context in which they occur (due to the potential presence of global variables and state save/restore commands), thereby requiring extensive parsing to extract comprehensive descriptions of given data items. The exact arrangement and protocol used in the data structure returned by descriptor parsing function 132 is not critical, except that it sets forth the required information about reports in a straightforward and comprehensive manner.

Furthermore, the particular structure used in the parsed report description has meaning only to the parser itself. Although the report description is passed back to the requesting client from descriptor parsing function 132, item retrieval steps in accordance with the invention involve further functions that are performed by parser 130, in which the parser utilizes the parsed report description. In accordance with the invention, the calling client program never needs to use the parsed report descriptions, except to provide them as arguments to item retrieval functions.

Item retrieval functions 133 are called by client programs to retrieve data items corresponding to specified usages. Each item retrieval function 133 receives arguments including:

a parsed report description (obtained using descriptor parsing function 132);

an HID report (obtained from HID class driver 106);

an HID usage specification; and an optional collection ID, specifying an HID collection referred to in the report descriptor.

In response to these arguments, an item retrieval function examines the designated HID report, finds one or more data items that have the same usage specifications as that supplied in the arguments, and returns the data item(s) to the requesting client. The parsed report description is used to locate items 11 corresponding to the given usage specification. If a collection ID is included in the arguments, the item retrieval function limits the returned data items to those in the specified collection.

The section, "Windows NT HID Client Design Guide," describes an example item retrieval interface function, named "HidP_GetUsages." This is an example of a button retrieval function. The HID usage specification in this example comprises only a usage page. The function searches the HID report for each data item corresponding to a usage index within the given usage page, and returns an array of usage indexes corresponding to HID buttons that are pressed—regardless of whether the HID report contains index arrays or bit fields.

"HidP_GetUsageValue" is another example of an item retrieval function described in the section "Windows NT HID Client Design Guide". For this function, the usage specification consists of both a usage page and a usage index. The function searches within the designated HID report for a data item corresponding to the specified usage page and usage index, and returns such a data item (in this case a multi-bit value) if it is found in the report.

"HidP_GetUsageValueArray" is yet another example of an item retrieval function. This function receives arguments including a usage page and a usage index and returns an array of corresponding value-type data items. This function is used in conjunction with usages that contain multiple data items for a single usage.

Note that all of these item retrieval functions are defined to receive normalized HID reports. The parsed report description, which is passed to the item retrieval functions, is based on normalized reports. Also note that each item retrieval function returns one of two different things: data items(s); or an error code indicating whether a control with the received usage specification is available on the device that generated the designated re port. More specifically, the error code indicates either that a control with the specified usage is not available on the subject device, or that the control is available on the device but not available in the submitted report (it will potentially be available in subsequent reports).

Interface functions exposed by parser 130 further include a collection identification function 134. This function is provided to assist application programs in dealing with HID collections. As noted above, collection IDs are optional parameters to the item retrieval functions. The collection IDs are obtained through collection identification function 134.

Collection identification function 134 receives an argument comprising a parsed report description, previously obtained by using descriptor parsing function 132. Based on this description, the function returns an array of data structures specifying HID collections, their HID usages, and their relationships. The order of the collections in the array indicates unique collection IDs for each collection. Each data structure in the array represents a collection, and specifies its usage as well as an index to related collections in the array. For example, the data structure references a parent collection (if there is one), a next sibling in a linked list of siblings, and a first child in a linked list of children. This allows a client to easily determine the structure of nested collections, and in turn to glean additional meanings associated with different controls—if duplicate data items are available, they can be distinguished based on the collections to which they belong. For a specific example of a collection identification function, refer to the "HidP_GetLinkCollectionNodes" function and the "HIDP_LINK_COLLECTION_NODE" structure described in section "Windows NT HID Client Design Guide," below.

These functions greatly simplify the process of retrieving data items from HID devices. A method of reading HID data in accordance with the invention comprises an initial step of obtaining an HID report descriptor and submitting it to parser 130 through descriptor parsing function 132. The parser performs a step of parsing the descriptor, and returns a parsed report description based on the report descriptor. These steps are performed during an initialization sequence.

To read data from the HID device, the client program performs steps of obtaining an HID report from HID class driver 106, and calling an item retrieval function 133 with arguments comprising the HID report, the parsed report description, a usage specification, and an optional collection ID. The item retrieval function (implemented by parser 130) searches the designated HID report for one or more data items that have the same usage specifications as designated in the arguments to the function, and returns these items to the calling client program. If a collection ID is specified, the search is limited to the specified collection of data items. This process is repeated for subsequent HID reports to read subsequent input data.

Writing is accomplished in a similar way. The parser includes one or more item write interface functions that prepare reports for writing to HID devices. Each item write function has arguments comprising a data item (or a plurality of data items), a parsed report description, an HID report, a usage specification, and an optional collection ID. Initially, the HID report is initialized to all zeroes. The item write function determines the appropriate place in the report and appropriately positions and formats the data item in the report based on the specified usage. If a collection ID is specified, the data item is positioned appropriately for that collection. The item write function also writes the proper report ID to the report, corresponding to the report where the specified usage is located. The function then returns the report to the requesting client program, which in turn writes the report to an HID device through class driver 106. If multiple usages are to be written, the client can call the item write function several times with the same report (specifying different usages), before writing the report to the HID device—as long as all specified usages are in the same report. An error code is returned if one of the usages is from a different report. In addition, an error code is returned if the specified usage is not available in any report, or if HID report format constraints prevent writing an additionally specified usage in the submitted report.

Conclusion

The invention is a significant improvement over the prior art. In the past, application programs were responsible for deciphering HID report data. Because reports from different devices are very different from each other, this was a very difficult task. With the invention, however, the work required to support a multitude of HID devices is greatly reduced. Once initialization is complete, a requesting client needs to specify little more than an HID usage—the item retrieval functions parse the HID reports and return the requested usage without any further work by the client. The client uses the same retrieval mechanism whether data items are formatted in the HID reports as index arrays or bit fields.

The advantages of this functionality arc considerable. Suppose that a relatively simple game program utilizes only the X and Y values of a joystick. In the past, the game could either have been configured for use with a single type of HID joystick, or it could have been designed with a very complex parsing component to determine how to read X and Y values from any HID joystick. With the invention, however, the game simply retrieves reports and then requests X and Y joystick usages from an item retrieval function. From the game program'perspective, the following variable factors are now irrelevant: the number of reports produced by the joystick; the sizes of the reports; whether the reports include report IDs; and the arrangement and formatting of data items within the reports. The game program can ignore all of these factors, and will still work with any HID joystick having X and Y joystick usages. This is true even if the joystick has a number of additional controls that are not used by the game program. New joysticks, having additional controls with new usages, will still work with the game program (even though the new controls will not be utilized).

Furthermore, the invention provides an easy and graceful way for applications programs to deal with new devices that have fewer controls than are optimally utilized by the program. If such a device is connected, the item retrieval functions will return an error value in response to any query for a data item corresponding to a usage that does not exist in the device. The application program can then take steps to provide equivalent functionality by different means.

Similarly, report normalization provides a significant advantages, both to client programs and to the parser. Because of report normalization, clients can easily read single reports. In addition, such size normalization makes it easier to pass data to parser functions. Consistently adding report IDs to reports simplifies the indexing of data items within reports—data always starts with the second byte of the report.

A further advantage of the invention is that collection descriptions are available to client programs in an easily decipherable array format. This allows clients to obtain simplified lists of collection nodes along with their respective usages. This, in turn, allows clients to optionally specify collections to the item retrieval functions in order to more specifically describe requested data items.

Although the invention has been described in language specific to structural features and/or methodological steps, it is to be understood that the invention defined in the appended claims is not necessarily limited to the specific features or steps described. Rather, the specific features and steps are disclosed as exemplary forms of implementing the claimed invention.

Windows NT HID Client Design Guide

This chapter contains the following information:
2.1 Types of HID Clients
   2.1.1 Kernel Mode Clients
   2.1.2 User Mode Clients
   2.2 Required and Optional Functionality for HID Clients
   2.3 installing a HID Client
   2.4 Initializing and Connecting a HID Client
   2.5 HID Device Data I/O
2.5.1 Obtaining a HID Device Report
2.5.2 Sending a HID Device Report
2.6 Interpreting HID Data
   2.6.1 Retrieving Data from a HID Device Report
   2.6.1.1 Obtaining Values
   2.6.1.2 Obtaining Buttons
2.6.2 Setting Data in a HID Report
   2.6.2.1 Setting Values
   2.6.2.2 Setting Buttons
2.6.3 Common issues with Data Interpretation
   2.6.3.1 Report ID Errors
   2.6.3.2 Dropped HID Reports
This chapter describes the various types of HID clients, what a HID client must and can support, and how data is retrieved or sent to the HID device. This chapter contains information for user mode HID client as well as kernel mode clients.

2.1 Types of HID Clients

FIG. 5 is a block diagram illustrating an HID joystick with kernel mode client.

Figure 6:
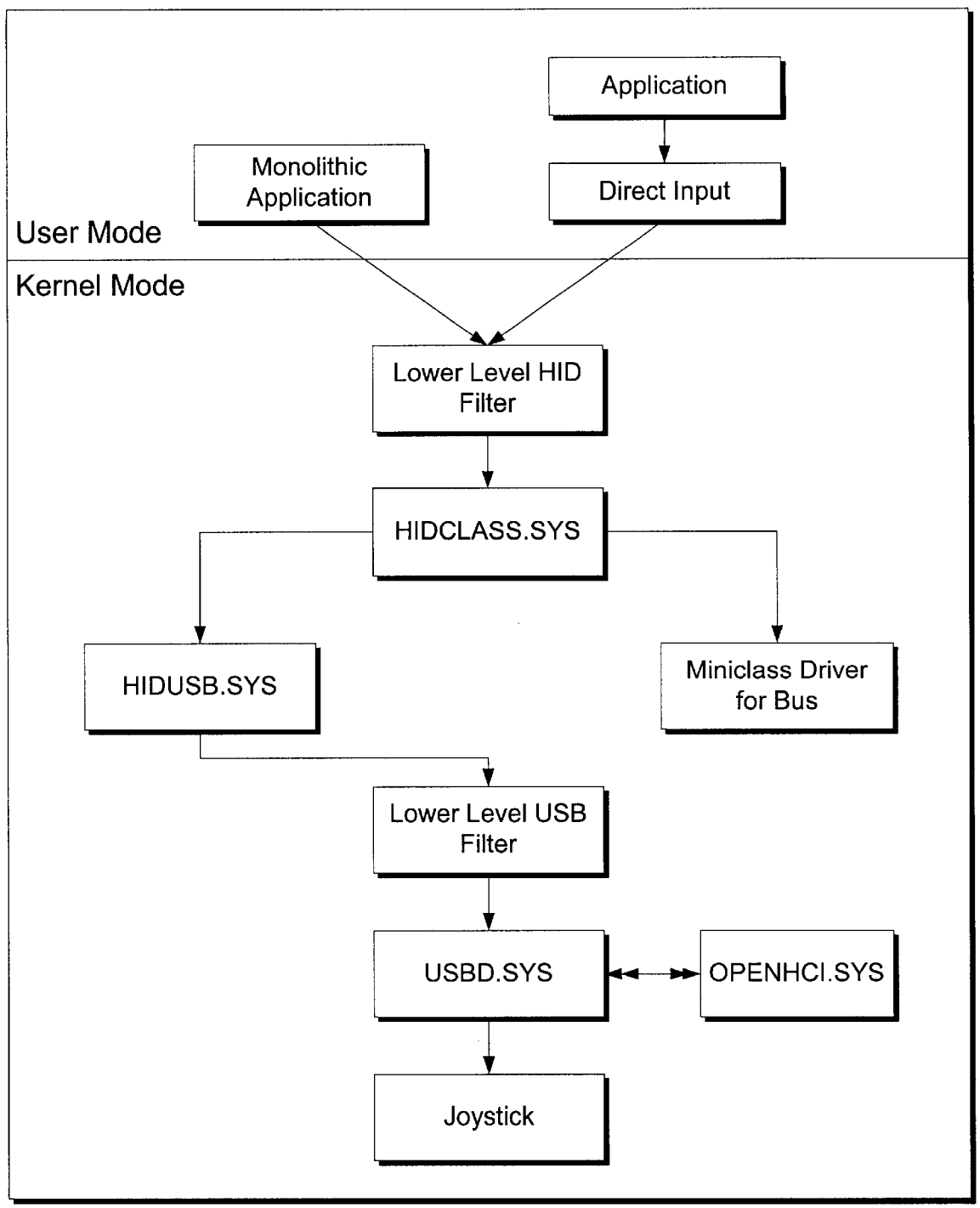
FIG. 6 is a block diagram illustrating an HID joystick with a user mode client.

FIG. 6 shows the same USB joystick with a user mode client instead of a kernel mode client.

In the HID architecture there are two types of HID clients: User mode, or application level, clients and kernel mode Clients. Each client has different capabilities and restrictions. FIG. 5 shows an hypothetical HLD joystick on a USB bus managed by a kernel mode client, while FIG. 6 shows the joystick with a user mode client.

2.1.1 Kernel Mode Clients

Kernel mode clients are software drivers that communicate with an underlying HID interface exposed by the HID class and miniclass driver pair.

2.1.2 User Mode Clients

User mode clients can either be applications that contain the necessary functionality to be a client, or they can be implemented as a separate standalone service or DLL that applications interface with.

Implementers of Clients do not necessarily have to write all replaceable components in a HID communications stack. For example, a HID client can communicate with standard HID devices for which the system provides a miniclass driver. In such a case a clients must only follow the procedures outlined for connecting to and obtaining data from a HID device to be functional. However, if the bus that the device, which the client is communicating with, resides on is not supported by a system-supplied component, then a miniclass driver and possibly a bus specific driver will have to be written. For example, a HID compliant joystick operating on a legacy game port would require the driver whiter to white a miniclass driver to interface between HID and the game port.

Driver writers should write a user mode client unless already writing a kernel mode driver to interface with HID.

2.2 Required and Optional Functionality for HID Clients

User Mode Clients Only

User mode clients are not required to have any specific functionality other than the required methods of opening, reading, writing, and interpreting data for a HID device. These steps are outlined in following sections in this Chapter.

Kernel Mode Clients Only

Kernel mode clients must, at a minimum, have the following functionality:
   A DriverEntry routine
   A plug and play notification routine
   A device unload routine
   Entry points for the following types of IRPs:
      IRP_MJ_CLEANUP
      IRP_MJ_POVVER
      IRP_MJ_PNP Kernel mode clients must also support a mechanism to transmit or receive data from a user of the client. This upper edge interface will be specific to the type of client being written. For example, a client that supports a kernel streaming interface will have different requirements than a client that supports a private IOCTL interface to a user mode application.

The requirements of kernel mode clients that are outlined in this section are lower edge interface requirements. Each client can Support one or more upper edge interfaces that will have their own requirements.

DriverEntry Routine

As a kernel mode client is kernel mode code, it must have a DriverEntry routine in order to be loaded.

In DriverEntry, a client creates a device object, creates a symbolic link for that device object (if needed), registers a plug and play notification routine to find all device class associations for HID collections that are present or that are added to the system, and registers, dispatch routines for the IRP MJ Xxx that this client handles.

Kernel mode clients must name this routine DriverEntry and follow the exact system-provided prototype for DriverEntry.

AddDevice Routine

All kernel mode clients must have an AddDevice routine registered in their device object.

Device Unload Routine

IRP MJ CLOSE

IRP MJ CREATE

IRP MJ CLEANUP 2.3 Installing a HID Client

User Mode Clients Only

User mode clients install themselves through the standard application installation procedures. For more information on how applications install themselves, see the Platform SDK.

Kernel Mode Clients Only

This material is to be determined.

2.4 Initializing and Connecting a HID Client

User Mode Clients Only

Load Time identification 'and Connection to HID Devices.

When a client is loaded it must identify and connect to all HID devices that it handles. To do so, a set of SetupDiXxx routines are provided by the system to find and identify the HID devices. The following information describes how HID clients use the setup and other Win32 routines to initialize and connect to the HID device. For specific information on the setup routines, see the Programmers Guide in this documentation set. For information on the Win32 routines, see the documentation for the Platform SDK.

After the client is loaded it calls HidD_GetHidGuid to obtain the system-defined GUID for HID devices. Then using that GUID, it calls SetupDiGetClassDevs to find all HID top-level collections currently present in the system. Client drivers should call this routine specifying DIGCF_PRESENT and DIFCP_INTERFACEDEVICE to find the HID collections. Once a client has called this routine, it will have an array of HDEVINFO structures, each array entry pertaining to a HID top-level collection.

Then using the information in the HDEVINFO structures, clients call SetupDiEmumlnteffaceDevice to retrieve interface device data information to be used in a call to SetupDiGetlnteffaceDeviceDetail. Clients should call SetupDi-EnumlnteffaceDevice repeatedly, updating the index field, until the routine returns ERRORNO_MORE_ENTRIES. Each call results in the client obtaining information about each top-level collection until data for all top-level collections have been obtained.

SetupDiGetlnteffaceDeviceDetail obtains a Sp_iNTERFACE_DEVICE_DETAIL._.DATA structure for the requested collection. The DevicePath member of this structure provides the user mode name of the device that is passed to the Win32 routine CreateFile to obtain a handle to the collection.

Notification of New HID Devices

Kernel Mode Clients Only

This material is to be determined.

All Clients

Once a connection has been made to the top level collection, clients begin by retrieving the capability data and other information about the device prior to any data input or output.

Clients must, before calling any other HidP_Xxx routine, allocate a buffer and store a pointer to the buffer to hold preparsed data far the device. The preparsed data is a required parameter to all idP_Xxx calls as it provides system-defined information to the HID parsing routines so that those routines can extract information at the request of the client. The preparsed data should be stored by the client until such time as the client has closed all handles to the device. To obtain the preparsed data, clients call HidD_GetPreParsedData, which-allocates memory for the preparsed data as well as obtains the data from the device. Clients should call HidD_FreePreParsedData when the preparsed data is no longer required.

After retrieving the preparsed data, clients then call HidP_GetCaps, that returns a HIDP_CAPS structure for the top-level collection. This information includes the usage page and usage identifiers for the top-level collection allowing the client to identify which top-level collections it needs to continue processing for and which it can immediately disconnect from.

If, after examining the usage page and usage identifiers for the top level collection, the client determines that this connection is of interest it obtains the capabilities of each button and value by calling one of the following routines:

| Routine | When Called |
| --- | --- |
| HidP_GetButtonCaps | For the button capability data for all |
| HidP_GetButtonCaps | For the button capability data for all buttons for a given type of report |
| HidP_GetSpecificButtonCaps | For the button capability data for all buttons of a specific usage page, usage, or link collection or any combination of the above for a given type of report |
| HidP_GetSpecificValueCaps | For the value capability data for all values that match a specific usage page, usage, or link collection or any combination of the above for a given type of report. |
| HidP_GetValueCaps | For the value capability data for all values for a given type of report. |

Capability data gives the client information the usage, size, behavior, and other properties of the button(s) or value(s). This capability data also gives the client the necessary information that it will need later to provide to its data requestor about what information it can provide.

Once a client has completed these steps, it has the necessary information to begin reading or writing data to the device. It is important that clients free any allocated resources that are not needed for long term use once initialization is complete as well as calling SetupDiDestroyDevicelnfoList. Failure to call SetupDiDestroyDevicelnfoList after completing all operations with the handle to the device list provided by SetupDiGetClassDevs causes a memory leak condition to occur.

2.5 HID Device Data I/O

Once a client driver has obtained a handle to a top-level collection and completed the necessary initialization, as outlined in section 2.4, it can then proceed to read data from or write data to the collection. This section details how user mode HID clients accomplish Such data I/O.

Data buffers supplied to obtain or to send reports to or from the HID class and miniclass drivers must be zero-initialized before calling the appropriate routine to send or receive the data. When allocating a buffer to use for report data the correct size to allocate can be obtained in the HIDP_CAPS structure that is retrieved from the device by calling HidP_GetCaps during the initialization process. See section 2.4 for further details on when and how to call HidP_GetCaps.

2.5.1 Obtaining a HID Device Report
User Mode Clients Only

When a client obtains a device report, it calls the Win32 routine ReadFile using the handle that was returned when the client connected to the top-level collection. When clients call ReadFile they need not specify an overlapped I/O request as the system supplied HID class driver buffers the data for the client in a "ring" buffer. However, the HID client can use overlapped I/O to have more than one read outstanding with the HiD class driver.

If a situation is encountered where the HID device is transmitting data to the HID class and miniclass driver faster than the client can retrieve the reports, data can be lost. However, the client can request that the HID class driver increase the size of the ring buffer such that the data is not lost. See section 2.6.3.2 for details on how to reset the ring buffer size.

However, obtaining feature reports occurs differently. To obtain a feature report, a client allocates a buffer of the required length, zero-initializes the buffer, and calls HidD_GetFeature.

Unlike other report types, a client can specify that a specific feature report be retrieved. To retrieve a specific feature report, the client will allocate the report, zero-initializes the buffer, sets the first byte of the buffer to the report ID that is being requested, and calls HidD_GetFeature.

All Clients

After the report has been retrieved from the HID class and miniclass drivers, the client then retrieves the state of values and buttons in the top-level collection by calling the HidP_Xxx parsing routines as outlined in section 2.6.

2.5.2 Sending a HiD Device Report
All Clients

When a client needs to send a report to a device, it must allocate a buffer of the correct length as outlined in section 2.5. Once this buffer has been allocated, clients call the HidP_Xxx parsing routines as outlined in section 2.6.2.

For a client to initialize a Specific report, the Client can specify, before calling an HidP_Xxx routine, the report ID in the first byte of the buffer it has allocated. For example, if a client is attempt to set "button 4" in a top level collection, it is possible that button 4 appears in two different reports. If the client was going to set 24 other buttons which are part of one report, but not the other, it would set the report ID in the first byte of the buffer before calling HidP_SetUsages. If the client did not do this, HidP SetUsages is not guaranteed to set up the report buffer with the correct information for the desired report. Setting the report ID in the buffer is an optional step and is not required for the HidP_Xxx routines to function properly.

User Mode Clients Only

Once the report has been initialized by the HidP_Xxx routines that the client has called to set the data in the report, the report is transmitted to the HID class and miniclass drivers by calling, WriteFile. Once the report has been transmitted, the class and mini lass drive r pair will send the data to the device.

In order to send a feature report to a top level collection, clients must call HidD_SetFeature instead of calling WriteFile.

2.6 Interpreting HID Data

The information contained within section 2.6 and subparts of this section applies to all types of clients.

By specification, a HID device can return its data in any order and in any precedence. Therefore, a client driver has a significant task in order to retrieve the data it is actually seeking from the raw data returned by the device. To assist in this process, the system provides a set of routines which, based on the device configuration, will extract the requested data from the report returned by the device. This section describes these routines and how a client uses them.

In addition, a client may wish to send a set of data to a HID device. In order to do this, the client must set the data into a report for the HID device in a certain format. The system provides routines that, based on the device configuration, sets the given data into a report that can be sent to the HID device at a time deemed appropriate by the HID client. This section also describes these routines and how a client driver uses them.

In either case, for retrieving or setting data in a report, clients should not attempt to do this manually. They must use the routines provided by the HID components in this system which include the routines described in this section.

2.6.1 Retrieving Data from a HID Device Report

For the two types of data, values and buttons, that can be retrieved from a HiD device, each has a set of routines to retrieve the data from the device report.

2.6.1.1 Obtaining Values

To retrieve a value from a HID device report, clients call one of the following routines:

HidP_GetScaledUsageValue
HidP_GetUsageValue
HidP_GetUsageValueArray

The following table is a guide to which routine a client driver should use to obtain a specific value from a HID data report:

| Routine Name | When Used |
| --- | --- |
| HidP_GetScaledUsageValue | To retrieve a value that is scaled or to retrieve an non-scaled valued in a signed format. |
| HidP_GetUsageValue | To retrieve a non-scaled value in an unsigned format or to retrieve a scaled value that is out of its normal range. |
| HidP_GetUsageValueArray | To retrieve values when there is more than one data item for a single usage. |

Client drivers who call Hidp_GetUsageValueArray will need to allocate a buffer large enough to hold the entire data. To calculate the size of the buffer needed to hold data, a client would multiply the BitSize and ReportCount members of the HIDP VALUE_CAPS structure for this value together. The resultant value is the number of bits required to hold the data. Clients should round this value up to the nearest byte and allocate a buffer of that size.

2.6.1.2 Obtaining Buttons

To retrieve the status of buttons in a HID device report, clients call one of the following routines:

HidP_GetUsages

HidP_GetUsagesEx

The following table is a guide to which routine a client driver should us to obtain the status of buttons from a HID data report:

| Routine Name | When Used |
| --- | --- |
| HidP_GetUsages | To retrieve the status of all buttons for a specific usage page. |
| HidP_GetUsagesEx | To retrieve the status of all buttons for all usage pages for this top level collection. |

Client drivers who call these routines will need to allocate buffers to hold the retrieved data from the HID report. The correct to hold an array of buttons can be found by calling HidP_MaxUsageListLength for the usage page in question. Or, if a client is calling HidP_GetUsagesEx it calls Hidp_MaxUsageListLength passing in a usage page value of zero. In either case, Hidp_MaxUsageListLength will return the number of array elements required to hold the either case, HidP_MaxUsageListLength will return the number of array elements required to hold the maximum number of buttons that could be returned from HidP_GetUsages or HidP_GetUsagesEx. To find the correct buffer size clients should take the value returned by HidP_MaxUsageListLength and multiply it by the size of the structure used to hold a button state as in:

sizeof (USAGE_AND_PAGE)

sizeof (USAGE)

As an example, for a client to obtain all button states it calls HidP_GetUsagesEx. Once the client had initialized a connection to the device, as outlined in section 2.4, it calls HidP_MaxUsageListLength with the UsagePage parameter of zero. The resultant value would be used to calculate the maximum buffer size needed. The following code is an example of such an operation:

{
   ULONG buttons, bufferSize;
   PHIDP_PREPARSED DATA preparsedData;
   buttons=HidP_MaxUsageListLength (HidP_Input, 0, & preparsed Data);
   bufferSize=buttons.* size of (USAGE_AND_PAGE) ;
}

When a client calls HidP_GetUsages it obtains an array of all buttons that currently are down (in a nonzero state). Once a client driver has obtained that array, it can call HidP_UsageListDifference to obtain what has changed between a previous call to HidP_GetUsages. This combination allows a client to quickly determine what buttons have changed state since the last button. state.

2.6.2 Setting Data in a HID Report

For the two types of data, values and buttons, that can be retrieved from a HID device, each has a set of routines to set the data in a device report for transmission to the HID device.

When clients allocate a buffer to be used to transmit to the device, they must provide zero-initialized buffer of the exact size expected. This size can be found in the HIDP_CAPS structure that is filled in by HidP_GetCaps in the members InputReportByteLength, OutputReportByteLength, and FeatureReportByteLength for input, output, and feature type reports respectively.

2.62.1 Setting Values

To set a value in a HID report, clients call one of the following routines:

HidP_SetScaledUsageValue

HidP_SetUsageValue

HidP_SetUsageValueArray

The following table is a guide to which routine a client should use to set a value in a HID report:

| Routine Name | When Used |
| --- | --- |
| HidP_SetScaledUsageValue | To set a signed scaled value into a report or to set a signed non scaled value into a report. |
| HidP_SetUsageValue | To set an unsigned value into a report. |
| HidP_SetUsageValueArray | To Set data for a series of data items for a single usage when more than one data items exists for the usage. |

Clients calling HidP_SetUsageValueArray must allocate a buffer large enough to hold the data size of what is to be inserted into a report. To calculate the size required, see the instructions for HidP_GetUsageValueArray in section 2.6.1.1.

Clients must zero all bytes in the report buffer before calling any of the above routines for the first time. After the first call to one of these routines, the buffer need not be rezeroed.

2.6.2.2 Setting Buttons

To set the button state for specific buttons in a report for transmission to a HID device, clients call HidP_SetUsages. When calling this routine, client pass a buffer that contains the usage identifiers of all buttons that should be placed in a down (nonzero) state.

Clients_calling HidP_SetUsages must zero all bytes in the report buffer before calling this routine. Failure to do so can cause incorrect data to be set in the report or cause an error, most commonly HIDP_STATUS_USAGE_NOT_FOUND, to be returned to the caller.

2.6.3 Common Issues with Data Interpretation

The following section contains common design issues that HID client drivers can obtain when retrieving or setting the data for their device.

2.6.3.1 Report ID Errors

When a client driver calls a HidP.Xxx routine that either gets or sets a button or value in a HID report, a possible error return is HIDP_STATUS_USAGE_NOT_FOUND. These return codes indicate-two similar, but different, problems with the HID data.

Figure 7:
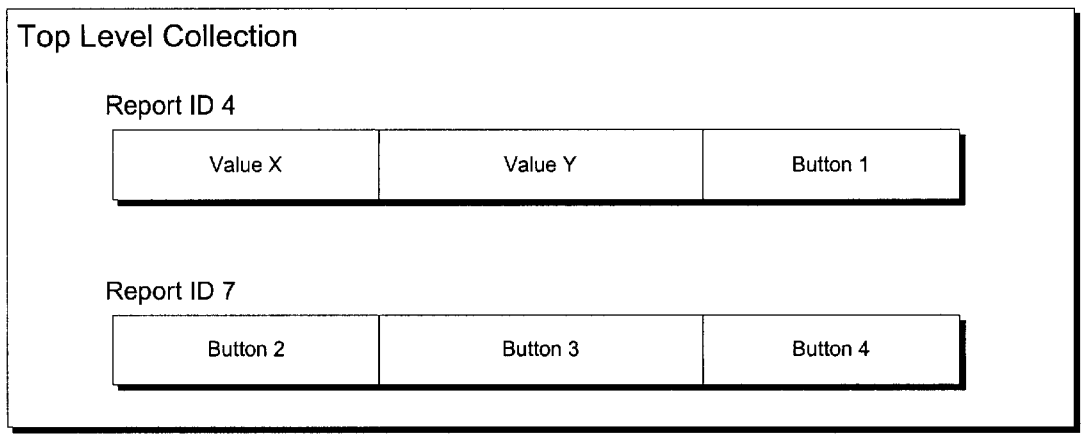
FIG. 7 is a block diagram illustrating HID reports.

Consider the example of a HID top level collection in FIG. 7.

When a client receives data from a HID device, it can be receiving any report that the top level collection contains. The HID device Is under no obligation to return a specific report or to return any series of reports in a specific order. Considering that, a client is not aware of what report it has received, thereby knowing if the data it is requesting is in the current data report. Consequently, the system HID components have a specific error system that informs the client when a situation is encountered where the data being requested is not in the report that the client has provided or where the data is completely unknown to the top level collection.

Using FIG. 5 as an example, a client has received a data report from the device. It then proceeds to call HidP_

GetUsageValue, requesting the current value of "Value X". The client has provided report seven. HidP_GetUsageValue will then return HIDP_STATUS_INCOMPATIBLE_REPORT_ID that indicates to the client that the data it is requesting is a valid request for the top-level collection, but it is not present in the data provided.

In comparison, if the client were to request data for "Value Z" from HidP_GetUsageValue, the routine would return HIDP_STATUS_USAGE_NOT_FOUND that indicates that the usage being requested is not valid for the top level collection and cannot be found in any report provided by the device.

When a client is setting data into a report for transmission to a HID device, an error return of HIDP_STATUS_INCOMPATIBLE_REPORT_ID has a different meaning. When HIDP_STATUS_INCOMPATIBLE_REPORT_ID is returned when calling HIdP_SetXxx it indicates that the report provided has already been configured with data for another report ID and the button or value provided to the routine does not belong to that report ID.

Consider FIG. 5 again. If a client were to call HidP_SetUsages setting buttons two and three; And then proceeded to call HidP_SetUsageValue setting "Value X", HidP_SetUsageValue would return HIDP_STATUS_INCOMPATIBLE_REPORT_ID because the report provided had already been configured for a different set of data for trans-mission to the device.

In the case of setting data to a device, HIDP STATUS_USAGE_NOT_FOUND indicates the same error as when retrieving data. That is, the usage specified could not be found in any report for the top-level collection. When clients encounter HIDP_STATUS_INCOMPATIBLE_REPORT they should take one of the following actions:

When setting data in a device report:

The client should allocate a new report of the correct length, zero initialize it, and then call the routine again. After calling all necessary HidP_Xxx routines, it sends both, or more, reports to the device.

When extracting data from a device report:

The client should attempt the call with a different report retrieved from the device as outlined in section 2.5.

2.6.3.2 Dropped HID Reports

The ability to reset the size of the ring buffer in the HID class driver is not currently implemented.

HID Support Routines for Clients

Windows NT® human input device (HID) clients can call the following routines to support HID devices.

This chapter covers routines for both user mode and kernel mode clients. As a general rule, user mode clients may call any routine in this chapter. However, kernel mode clients may only call routines that begin with the prefix HidP. See the individual routine comments to determine the availability of a routine. Routines in this chapter are listed in alphabetical order.

HidD FlushQueue
BOOLEAN
   HidD_FlushQueue(
   IN HANDLE HidDeviceObject
);
HidD_FlushQueue causes a HID drivers to delete all pending information from an input queue of a HID device.
Parameters
HidDevice Object
   Specifies the open handle of a HID device for which the queue is to be flushed.
Return Value
   HidD_FlushO. ueue returns TRUE if the routine completed without error.
Comments
   Only user Mode clients can call HidD_FlushOueue.
HidD_FreePreparsedData
BOOLEAN
   HidD_FreePreparsedData(
   IN PHIDP_PREPARSED_DATA PreparsedData
   );
HidD_FreePreparsedData: releases the resources allocated to hold preparsed data for the HiD device.
Parameters
PreparsedData
   Points to a buffer, returned from HidD_GetPreparsedData, that is to be freed.
Return Value
   HidD FreePreparsedData returns TRUE if the buffer was freed successfully. If FALSE is returned it indicates that the buffer was not a preparsed data buffer.
Comments
   Only user mode clients can call HidD_FreePreparsedData.
See Also
HidD_GetPreparsedData
HidD_GetConfiguration
BOOLEAN
   HidD_GetConfiguration(
   IN HANDLE HidDeviceObject,
   IN-PHIDD CONFIGURATION Configuration,.
   IN ULONG ConfigurationLength"
   );
This routine is not currently implemented and is reserved for future use.
HidD_GetFeature
BOOLEAN
   HidD_GetFeature(
   IN HANDLE HidDeviceObject
   OUT PVOID ReportBuffer,
   IN ULONG ReportBufferLength
   );
HidD_GetFeature is not yet implemented and is reserved for future use.
HidD_GetHidGuid
VOID
   HidD_GetHidGuid(
   OUT LPGUID HidGuid
   );
HidD_GetHidGuid returns the GUID associated with HID devices.
Parameters
HidGuid
   Points to a variable to hold the GUID that is associated with all HID devices.
Comments
   Only user mode clients can call HidD_GetHidGuid.
HidD_GetPreparsedData
BOOLEAN
   HidD_GetPreparsedData(
   IN HANDLE HidDeviceObject,
   OUT PHIDP PREPARSED_DATA *PreparsedData
   );
HidD_GetPreparsedData retrieves preparsed data that is used to describe the data returned from a HiD device.
Parameters HidDeviceObject
  Specifies the open handle of a HID device from which the preparsed data is to be retrieved.
PreparsedData
  Points to a variable to hold the address of a routine-allocated buffer containing the preparsed data from the device.
Return Value
  HidD_GetPreparsedData returns TRUE if the routine completed without error.
Comments
  Only user mode clients can call HidD_GetPreparsedData—
  When the preparsed data returned by this routine is no longer needed, clients should call HidD_FreePreparsedData to free the buffer allocated for the preparsed data.
See Also
HidD_FreePreparsedData
HidD_SetConfiguration
BOOLEAN
  HidD_SetConfiguration(
  IN HANDLE HidDeviceObject.
  IN PHIDD 'CONFIGURATION Configuration.
  IN ULONG ConfigurationLength
This routine is not currently implemented and is reserved for future use.
HidD_SetFeature
BOOLEAN
  HidD_getFeature(
  IN HANDLE HidDeviceObject,
  IN PVOID ReportBuffer,
  IN ULONG ReportBufferLength
  );
HidD_SetFeature is not yet implemented.
HidP_GetButtonCaps
NTSTATUS
  HidP_GetButtonCaps(
  IN HIDP_REPORT_TYPE ReportType,
  OUT PHIDP_BUTTON_CAPS ButtonCaps,
  IN OUT PULONG ButtonCapsLength,
  IN PHIDP_PREPARSED_DATA PreparsedData
  );
HidP_GetButtonCaps returns the capabilities for all buttons for a given top level collection.
Parameters
ReportType
  Specifies the type of report for which to retrieve the button capabilities.
  This parameter must be one of the following:
  HidP_Input
    Specifies that HidP_GetUsages return the button capabilities for all input reports.
  HidP_Output
    Specifies that HidP_GetUsages return the button capabilities for all outputreports.
  HidP_Feature
    Specifies that HidP_GetUsages return the button capabilities for all feature reports.
Button Caps
  Points to a caller-allocated buffer that will contain, on return, an array of HIDP_BUTTON_CAPS structures that contain information for all buttons on the HID device.
ButtonCapsLength
  Specifies the length on input, in array elements, of the buffer provided at ButtonCaps.
  On output, this parameter is set to the actual number of elements that were returned by this routine, in the buffer provided at ButtonCaps if the routine completed without error.
  The correct length necessary to retrieve the button capabilities can be found in the capability data returned for the device by HidP_GetCaps.
PreparsedData
  Points to the preparsed data returned for the device when top-level collection information was obtained at initialization.
Return Value
  HidP_GetButtonCaps returns one of the following HIDP_XXX status codes:
  HIDP STATUS_SUCCESS
    Indicates that the routine completed successfully.
  HIDP STATUS_INVALID_PREPARSED_DATA
    Indicates the preparsed HID device data provided at PreparsedData is malformed.
Comments
  This routine will retrieve the capability data for all buttons in the top level collection without regard to the usage, usage page, or link collection. To retrieve button capabilities for a specific usage, usage page, or link collection use Hidp_GetSpecificButtonCaPs instead. Callers of this routine must be running at IRQL PASSIVE_LEVEL.
See Also
HidP_GetSpecificButtonCaPs, 'HidP_GetCapS., HIDP BUTTON CAPS
HidP_GetCaps
NTSTATUS
  HidP_GetCaps(
  IN PHIDP_PREPARSED_DATA PreparsedData,
  IN PHIDP_CAPS Capabilities,
  );
  HidP_GetCaps returns the capabilities of a HID device based on the given preparsed data.
Parameters
PreparsedData
  Points to a caller-allocated buffer that holds the top level collection description retrieved from the HID device.
Capabilities
  Points to a caller-allocated buffer that, on return, contains the parsed capability information for this HID device.
Return Value
  HidP_GetCaps returns HIDP_STATUS_SUCCESS if the routine completed parsing of the data successfully.
  HiDP_STATUS_INVALID_PREPARSED_DATA is returned if the preparse data pointed to by PreparsedData is malformed.
Comments
  Drivers obtain the top level collection data used at PreparsedData by calling HidD_GetPreparsedData
  For kernel mode Clients, the caller-allocated buffer supplied at PreparsedData must be allocated from nonpaged pool.
  Callers of this routine must be running at IRQL PASSIVE_LEVEL.
See Also
HidD_GetPreparsedData HIDP CAPS
HidP_GetLinkCollectionNodes
NTSTATUS
  HidP GetLinkOollectionNodes(
  OUT PHIDP_LINK_COLLECTION_NODE LinkCollectionNodes,
  IN OUT PULONG LinkCollectionNodesLength, IN PHIDP_PREPARSED_DATA PreparsedData
);
HidP_GetLinkCollectionNodes returns an array of LINK_COLLECTION_NODE structures that describes the relationships and layout of the link collections within this top level collection.

Parameters

LinkCollectionNodes

Points to a caller-allocated array of HIDP_LINK_COLLECTION_NODE structures in which HidP_GetLinkCollectionNodes returns an entry for each collection within the top-level collection.

LInkCollectionNodesLength

Specifies, on input, the length, in array elements, of the buffer provided at LinkCollectionNodes. On output, this parameter is set to the number of entries in the array at LinkCollectionNodes that were initialized.

PreparsedData

Points to the preparsed data returned for the device when top-level collection information was obtained at initialization.

Return Value

HidP_GetLinkCollectionNodes returns one of the following HIDP_XXX status codes:

HIDP_STATUS_SUCCESS

Indicates that the routine completed successfully.

HIDP_STATUS_BUFFER_TOO_SMALL

Indicates that the buffer provided at LinkCollectionNodes is too small to hold all entries for the link collection nodes. LinkCollectionNodesLength is set to the length, in array elements, required to hold the link collection nodes information.

Comments

The length of the buffer required, in array elements, for an entire link collection node array is found in the HIDP_CAPS structure member NurnberLinkCollectionNodes-Clients obtain HIDP_CAPS information by calling HidP_GetCaps. For information on the relationships of link collections described by the data returned from this routine, see HIDP_LINK_COLLECTION_NODE. Callers of this routine must be running at IRQL<=DISPATCH_LEVEL.

See Also

HidP_GetCaps, HIDP CAPS, HIDP LINK COLLECTION NODE

Indicates that the report length provided in ReportLength is not the expected length of a report of the type specified in ReportType.

HIDP STATUS_BAD_LOG_PHY_VALUES

Indicates that the device has returned an illegal logical and physical value preventing scaling. To retrieve the values returned by the device call HidP_GetUsageValue instead.

HIDP_STATUS_NULL

Indicates the current state of the scaled value data from the device is less than the logical minimum or is greater than the logical maximum but the scaled value has a NULL state.

HIDP_STATUS_VALUE_OUT_OF_RANGE

Indicates the current state of the scaled value data from the device is less than the logical minimum or is greater than the logical maximum.

HIDP_STATUS_INCOMPATIBLE_REPORT_ID

Indicates that the value specified by the parameters Usage, UsagePage, and optionally LinkCo~ection is known, but cannot be found in the data provided at Report.

HIDP_STATUS_USAGE NOT_FOUND

Indicates that the data specified by the values provided at Usage, UsagePage, and optionally LinkCollection cannot be found in any data report.

Comments

The caller-allocated buffers supplied at PreparsedData, Usage Value, and Report must be allocated from non-paged pool. Callers who wish to obtain all data for a usage that contains multiple data items for a single usage must called HidP_GetUsageValueArray instead. Callers of this routine must be running at IRQL<=DISPATCH_LEVEL.

See Also

HidP_GetUsageValue

HidP_GetSpecificButtonCaps

NTSTATUS
  HidP_GetSpecificButtonCaps(
  IN HIDP_REPORT_TYPE ReportType,
  IN USAGE UsagePage,
  IN USHORT LinkCollection,
  IN USAGE Usage,
  OUT PHIDP_BUTTON_CAPS Button Caps,
  IN OUT PULONG ButtonCapsLength,
  INPHIDP_PREPARSED_DATAPreparsedData
  );

HidP_GetSpecificButtonCaps retrieves the capabilities for all buttons in a specific type of report that meet the search criteria.

Parameters

ReportType

Specifies the type of report for which to retrieve the button capabilities. This parameter must be one of the following values:

HidP_Input

Specifies that HidP_GetUsages return the button capabilities for all input reports.

HidP Output

Specifies that HidP_GetUsages return the button capabilities for all output reports.

HidP Feature

Specifies that HidP_GetUsages return the button capabilities for all feature reports.

UsagePage

Specifies a usage page identifier to use as a search criteria. If this parameter is nonzero, then only buttons that specify this usage page will be retrieved.

LinkCollection

Specifies a link collection identifier to use as a search criteria. If this parameter is nonzero, then only buttons that are part of this link collection will be retrieved.

Usage

Specifies a usage identifier to use as a search criteria. If this parameter is nonzero, then only buttons that specify this usage will be retrieved.

ButtonCaps

Points to a caller-allocated buffer that will contain, on return, an array of HIDP_BUTTON_CAPS structures that contain information for all buttons that meet the search criteria.

ButtonCapsLength

Specifies the length on input, in array elements, of the buffer provided at Button caps.

On output, this parameter is set to the actual number of elements that were set by this routine, into the buffer provided at Button Caps.

The correct length necessary to retrieve the button capabilities can be found in the capability data returned for the device by HidP_GetCaps.

PreparsedData

Points to the preparsed data returned for the device when top level collection information was obtained at initialization.

Return Value

HidP_GetSpecifiCButtonCaps returns one of the following HIDP_XXX status codes:

HIDP_STATUS_SUCCESS

Indicates that the routine completed successfully.

HIDP STATUS INVALID PREPARSED_DATA

Indicates the preparsed HID device data provided at PreparsedData is malformed.

Comments

HidP_GetSpecificButtonCaps is used as a search routine to retrieve button capability data for buttons that meet given search criteria as opposed-to HidP_GetButtonCaps which returns the capability data for all buttons on the device. Calling HidP_GetSpecificButtonCaps specifying zero for UsagePage, Usage, and LinkCollection is functionally equivalent to calling HidP_GetButtonCaps.

Callers of this routine must be running at IRQL PASSIVE_LEVEL.

See Also

HidP_GetButtonCaps, HidP_GetCaps, HIDP_BUTTON_CAPS

HidP_GetSpecificValueCaps

NTSTATUS

HidP_GetSpecificValueCaps(
   IN HIDP_REPORT_TYPE ReportType,
   IN USAGE UsagePage,
   IN USHORT LinkCollection,
   IN USAGE Usage,
   OUT PHIDP_VALUE_CAPS ValueCaps,
   IN OUT PULONG ValueCapsLength,
   IN PHIDP_PREPARSED_DATA PreparsedData
   );

HidP_GetSpecificValueCaps retrieves the capabilities for all values in a specific type of report that meet the search criteria.

Parameters

ReportType

Specifies the type of report for which to retrieve the value capabilities. This parameter must be one of the following values:

HidP_Input

Specifies that Hidp_GetUsages return the value capabilities for all input reports.

HidP_Output

Specifies that HidP_GetUsages return the value capabilities for all output reports.

HidP_Feature

Specifies that HidP_GetUsages return the value capabilities for all feature reports.

UsagePage

Specifies a usage page identifier to use as a search criteria. If this parameter is nonzero, then only values that specify this usage page will be retrieved.

LinkCollection

Specifies a link collection identifier to use as a search criteria. If this parameter is nonzero, then only values that are part of this link collection will be retrieved.

Usage

Specifies a usage identifier to use as a search criteria. If this parameter is nonzero, then only buttons that specify this value will be retrieved.

Value Caps

Points to a caUer-allocated buffer that will contain, on return, an array of HIDP_VALUE_CAPS structures that contain information for all values that meet the search criteria.

Value CapsLength

Specifies the length on input, in array elements, of the buffer provided at ValueCaps.

On output, this-parameter is set to the actual number of elements that were set by this routine, into the buffer provided at Value Caps.

The correct length necessary to retrieve the value capabilities can be found in the capability data returned for the device by HidP_GetCaps.

PreparsedData

Points to the preparsed data returned for the device when top level collection information was obtained at initialization Return Value HidP_GetSpecificValueCaps returns a HIDP_XXX status code from the following list:

HIDP_STATUS_SUCCESS

Indicates that the routine completed successfully.

HIDP STATUS INVALID_PREPARSED_DATA

Indicates the preparsed HID device data provided at PreparsedData is malformed.

Comments

HidP_GetSpecificValueCaps is used as a search routine to retrieve button capability data for buttons that meet given search criteria as opposed to HidP_GetValueCaps which returns the capability data for all buttons on the device. Calling HidP_GetSpecificValueCaps specifying zero for UsagePage, Usage, and LinkCollection is functionally equivalent to calling HidP GetValueCaps.

Callers of this routine must be running at IRQL PASSIVE_LEVEL.

See Also

HidP_GetCaps, HidP_GetValueCaps., HIDP_VALUE_CAPS

HidP_GetUsages

NTSTATUS

HidP_GetUsages(
   IN HIDP_REPORT_TYPE ReportType,
   IN USAGE UsagePage,
   IN USHORT LinkCollection, /*optional*/
   OUT USAGE *UsageList,
   IN OUT ULONG *UsageLength,
   IN PHIDP_PREPARSED_DATA PreparsedData,
   IN PCHAR Report,
   IN ULONG ReportLength
   );

HidP_GetUsages takes a report from a HID device and returns the current state of the buttons in that report.

Parameters

ReportType

Specifies the type of report, provided at Report, from which to retrieve the buttons. This parameter must be one of the following values:

HidP_Input

Specifies that the device data report provided at Report is an input report.

HidP-Output

Specifies that the device data report provided at Report is an output report.

HidP Feature

Specifies that the device data report provided at Report !s a feature report.

UsagePage

Specifies the usage page of the buttons for which to retrieve the current state.

LinkCollection

Optionally specifies a link collection identifier used to retdeve only specific button states. If this value is nonzero, only buttons that are part of the given link collection will be returned.

UsageList

Points to a caller-allocated buffer that contains, on return, the usages of all buttons that are down which belong to the usage page specified in UsagePage.

UsageLength

Is the length, in array elements, of the buffer provided at UsageList. On return this parameter is set to the number of button states that were set by this routine into the buffer provided at UsageList. If the error HIDP_STATUS_BUFFER_TOO_SMALL was returned, this parameter will contain the number of array elements required to hold all button data requested.

The maximum number of buttons that can ever be returned for a given type of report can be obtained by calling HidP_MaxUsageListLength.

PreparsedData

Points to the preparsed data returned for the device when collection information was obtained at initialization.

Report

Points to the device data that contains the button states to be retrieved.

ReportLength

Is the length, in bytes, of the buffer provided at Report.

Return Value

HidP_GetUsages returns a HIDP_XXX status code from the following list:

HIDP_STATUS_SUCCESS

Indicates that the routine completed successfully.

HIDP_INVALID_REPORT_TYPE

Indicates that the value specified in ReportType was invalid.

HIDP_STATUS_BUFFER_TOO_SMALL

Indicates that the buffer provided at UsageList is too small to held the data retrieved. The correct length to retrieve all usages can be found in the capability data returned by HidP_GetCaps.

HIDP_INVALID_REPORT_LENGTH

Indicates that the report length provided in ReportLength is not the expected length of a report of the type specified in ReportType.

HIDP_STATUS_INVALID_PREPARSED_DATA

Indicates the preparsed HID device data provided at PreparsedData is malformed.

HIDP_STATUS_INCOMPATIBLE_REPORT_ID

Indicates that the buttons states specified by the parameter UsagePage is known, but cannot be found in the data provided at Report.

HIDP_STATUS_USAGE_NOT_FOUND

Indicates that button states specified by the parameter UsagePage cannot be found in any data report for the HiD device.

Comments

Callers of this routine must be running at IRQL<= DISPATCH_LEVEL.

See Also

HidP_GetCaps, HidP_MaxUsageListLength

HidP_GetUsagesEx

NTSTATUS

IN HIDP_REPORT_TYPE ReportType,

IN USHORT LinkCollection,

OUT PUSAGE_AND_PAGE ButtonList,

IN OUT ULONG *UsageLength,

IN PHIDP_PREPARSED_DATA PreparsedData,

IN PCHAR Report,

IN ULONG ReportLength

);

HidP_GetUsagesEx takes a report from a HID device and returns the current state of the all buttons in the given data report.

Parameters

ReportType

Specifies the type of report, provided at Report, from which to retrieve the button states. This parameter must be one of the following values:

HidP_Input

Specifies that the device data report provided at Report is an input report. HidP_Output Specifies that the device data report provided at Report is an output report.

HidP Feature

Specifies that the device data report provided at Report is a feature report.

LinkCollection

Optionally specifies a link collection identifier used to retrieve only specific button states. If this value is nonzero, only buttons that arc part of the given link collection will be returned.

ButtonList

Points to a caller-allocated buffer that contains, on return, the usage and usage page values of each button that is down.

UsageLength

Is the length, in array elements, of the buffer provided at UsageList. On return this parameter is set to the number of button states that were set by this routine into the buffer provided at UsageList. If the error HIDP_STATUS_BUFFER_TOO_SMALL was returned, this parameter will contain the number of array elements required to hold all button data requested.

The maximum number of buttons that can ever be returned for a given type of report can be obtained by calling HidP_MaxUsageListLength.

PreparsedData

Points to the preparsed data returned for the device when collection information was obtained at initialization.

Report

Points to the device data that contains the button states to be retrieved.

ReportLength

Is the length, in bytes, of the buffer provided at Report.

Return Value

HidP_GetUsagesEx returns a HIDP_XXX status code from the following list:

HiDP_STATUS_SUCCESS

Indicates that the routine completed successfully.

HIDP_INVAUD_REPORT_TYPE

Indicates that the value specified in ReportType wasinvalid. HIDP

STATUS SUFFER_TOO SMALL

Indicates that the buffer provided at UsageList is too small to hold the data retrieved. The correct length to retrieve all usages can be found in the capability data returned by HidP_GetCaps.

HIDP INVALID REPORT LENGTH

Indicates that the report length provided in ReportLength is not the expected length of a' report of the type specified in ReportType.

HIDP STATUS INVALID_PREPARSED_DATA

Indicates the preparsed HID device data provided at PreparsedData is malformed.

HIDP STATUS USAGE_NOT_FOUND
Indicates that no buttons could be found for this HID device.
Comments
Callers of this routine must be running at IRQL<= DISPATCH_LEVEL.
See Also
HidP_GetCaps, HidP_MaxUsageLlstLength, USAGE_AND_PAGE
HidP_GetUsageValue
NTSTATUS
HidP_GetUsageValue(
IN HIDP_REPORT_TYPE ReportType,
IN USAGE UsagePage,
IN USHORT LinkCoflection,
IN USAGE Usage,
OUT PULONG UsageValue,
IN PHIDP_PREPARSED_DATA PreparsedData,
N PCHAR Report,
IN ULONG ReportLength
);
HidP_GetUsageValue returns a value from a device data report given a selected search criteria.
Parameters
ReportType
Specifics the type of report, provided at Report, from which to retdeve the value. This parameter must be one of the following values: HidP_Input
Specifies that the device data report provided at Report is an input report.
HidP Output
Specifies that the device data report provided at Report is an output report.
HidP Feature
Specifies that the device data report provided at Report is a feature report
UsagePage
Specifies the usage page identifier of the value to retrieve.
linkCollection Optionally specifies the link collection identifier of the value to be retrieved.
Usage
Specifies the usage of the scaled valued to retrieve.
Usage Value
Points to a variable, that on return from this routine, holds the value retrieved from the device report.
PreparsedData
Points to the preparsed data returned for the device when collection information was obtained at initialization.
Report
Points to the device data that contains the value to be retrieved.
ReportLength
Is the length, in bytes, of the buffer provided at Report.
Return Value
HidP_GetUsageValue returns a HIDP_XXX status code from the following list:
HIDP STATUS SUCCESS
Indicates that the routine completed successfully.
HIDP STATUS INVALID pREPARSED DATA
Indicates the preparsedHID device data provided at PreparsedData is malformed.
HIDP STATUS INVALID REPORT_TYPE
Indicates that the value specified in ReportType was invalid.
HIDP STATUS INVALID_REPORT_LENGTH
Indicates that the report length provided in ReportLength is not the expected length of a report of the type specified in ReportType.

HIDP STATUS USAGE NOT,_FOUND
Indicates that the usage specified by the values provided' at Usage, UsagePage, and, optionally, LinkCollection could not be found in the report data provided.
HIDP STATUS INCOMPATIBLE REPORTJD
Indicates that the value specified by the parameters Usage, UsagePage, and optionally LinkCollection is known, but cannot be found in the data provided at Report.
HIDP STATUS USAGENOT,_FOUND
Indicates that the data specified by the values provided at Usage, UsagePage, and optionally linkCollection cannot be found in any data report.
Comments
This routine does not sign the value. To have the sign bit automatically applied, use the routine HidP GetScaledUsageValue instead. For manually assigning the sign bit, the position of the sign bit can be found in the HIDP_VALUE_.CAPS structure for this value.
Callers who wish to obtain all data for a usage that contains multiple data items for a single usage must called HidP_GetUsageValueArray instead.
Callers of this routine must be running at IRQL<= DISPATCH_LEVEL.
See Also
HidP_GetScaledUsageValue, HIDP_VALUE_CAPS
HidP_GetUsageValueArray
NTSTATUS
HidP_GetUsageValueArray(
IN HIDP REPORT_TYPE ReportType,
IN USAGE UsagePage,
IN USHORT LinkCollection /*optional*/
IN USAGE Usage,
OUT PCHAR UsageValue,
IN USHORT UsageValueByteLength,
IN PDIP_PREPARSED_DATA PreparsedData,
IN PCHAR Report,
IN ULONG ReportLength
);
HidP_GetUsageValueArray returns the device data for a usage that contains multiple data items for a single usage.
Parameters
ReportType
Specifies the type of report, provided at Report, from which to retrieve the values. This parameter must be one of the following values:
HidP_Input
Specifies that the device data report provided at Report is an input report
HidP
Output
Specifies that the device data report provided 'at Report is an output report.
HidP_Feature
Specifies that the device data report provided at Report is a feature report.
UsagePage
Specifies the usage page identifier of the data to be retrieved.
LinkCollection
Optionally specifies the link collection identifier of the data to be retrieved.
Usage
Specifies the usage identifier of the valued to retrieve.
Usage Value
Points to a caller-allocated buffer that contains, on output, the data from the device. The correct length for this buffer can be found by multiplying the ReportCount and BitSize fields of the HIDP_VALUE_CAPS structure for this value and rounding the resultant value up to the nearest byte.
UsageValueByteLength
Specifies the length in bytes, of the buffer at Usage Value
PreparsedData
Points to the preparsed data returned for the device when collection information was obtained at initialization.
Report
Points to the device data that contains the data to be retrieved.
ReportLength
Is the length, in bytes, of the buffer provided at Report.
ReturnValue
HidP_GetUsageValueArray returns a HIDP_XXX status code from the following list:
HIDP_STATUS_SUCCESS
Indicates that the routine completed successfully.
HIDP STATUS INVALID_PREPARSED_DATA
Indicates the preparsed HID device data provided at PreparsedData is malformed.
HIDP STATUS INVALID_REPORT_TYPE
Indicates that the value specified in ReportType was invalid.
HIDP STATUS INVALID REPORT LENGTH
Indicates that the report length provided in ReportLength is not the expected length of a report of the type specified in ReportType.
HIDP STATUS NOT VALUE_ARRAY
Indicates that the requested usage has only one data item. To retrieve the data, clients should call HidP_GetUsageValue or Hidp_GetScaledUsageValue instead.
HIDP STATUS BUFFER_TOO_SMALL
Indicates that the buffer provided at Usage Value is too small to hold the data requested. The correct length to retrieve all data for this usage can be found by multiplying the values in BitSize and ReportCount, from the HIDP_VALUE_CAPS structure for this value, together and round the resultant value up to the nearest byte.
HIDP STATUS_INCOMPATIBLE_REPORTJD
Indicates that the value specified by the parameters Usage, UsagePage, and optionally LinkCollection is known, but cannot be found in the data provided at Report.
HIDP STATUS_USAGE_NOT_FOUND
Indicates that the data specified by the values provided at Usage, UsagePage, and optionally LinkCollection cannot be found in any data report for this top-level collection.
Comments
When HidP_GetUsageValueArray retrieves the data, it will fill in the buffer in little-endian order beginning with the least significant bit of the data for this usage, The data is filled in without regard to byte alignment.
Callers of this routine must be running at IRQL<= DISPATCH_LEVEL.
See Also
HidP_GetScaledUsageValue, HidP_GetUsageValue.
HidP_GetValueCaps
NTSTATUS
 HidP_GetValueCaps(
 IN HIDP_REPORT_TYPE ReportType,
 OUT PHIDP VALUE_CAPS ValueCaps,
 IN OUT PULONG ValueCapsLength,
 IN PHIDP_PREPARSED_DATA PreparsedData
HidP_GetValueCaps retrieves the capabilities of all values for a given top level collection.
Parameters
ReportType
Specifies the type of report for which to retrieve the value capabilities. This parameter must be one of the following values:
HidP_Input
Specifies that HidP_GetUsages return the value capabilities for all input reports.
HidP Output
Specifies that HidP_GetUsages return the value capabilities for all output reports.
HidP Feature
Specifics that HidP_GetUsages return the value capabilities for all feature reports.
ValueCaps
Points to a caller-allocated buffer that will contain, on return, an array of HIDP_VALUE._CAPS structures that contain information for all values in the top level collection.
ValueCapsLength
Specifies the length on input, in array elements, of the buffer provided at ValueCaps. On output, this parameter is set to the actual number of elements that were set by this routine, into the buffer provided at ValueCaps. The correct length necessary to retrieve the value capabilities can be found in the capability data returned for the device by HidP_GetCaps.
PreparsedData
Points to the preparsed data returned for the device when collection information was obtained at initialization.
Return Value
HidP_GetValueCaps returns a HIDP_XXX status code from the following list:
HIDP STATUS_SUCCESS
Indicates that the routine completed successfully.
HIDP STATUS_INVALID PREPARSED_DATA
Indicates the preparsedHID device data provided at PreparsedDatais malformed.
Comments
This routine will retrieve the capability data for all values in the top level collection without regard to the usage, usage page, or link collection of the value. To retrieve value capabilities for a specific usage, usage page, or link collection use Hidp_GetSpecificValueCaPs instead.
Callers of this routine must be running at IRQL<= DISPATCH LEVEL.
See Also
HidP_GetCaps, HidP_GetSpecificValueCaps, HIDP_VALUE_CAPS
HidP_MaxUsageListLength
ULONG
 HidP_MaxUsageListLength(
 HIDP_REPORT._TYPE ReportType,
 USAGE UsagePage, 1*optional*/
 IN PHIDP_PREPARSED_DATA PreparsedData
 );
HidP_MaxUsageListLength returns the maximum number of buttons that can be returned from a given report type for the top level collection.
Parameters
ReportType
Specifies the report type for which to get a maximum usage count. ReportType must be one of the following values:
HidP_Input
Specifies that HidP_MaxUsageListLength should return the maximum number of buttons for an input report.
HidP Output
Specifies that HidP_MaxUsageListLength should return the maximum number of buttons for an output report.

HidP Feature
  Specifies that Hidp_MaxUsageLlstLength should return the maximum number of buttons for an feature report.
UsagePage
  Optionally specifics a usage page identifier to use as a search criteria. If this parameter is zero, the routine returns the number of buttons for the entire top-level collection regardless of usage page.
PreparsedData
  Points to the preparsed data returned for the device when collection information was obtained at initialization.
Return Value
  HidP MaxUsageLength returns the maximum number of buttons, that are, of the given usage page, that will be returned in a given report type. If the buffer provided at PreparsedData or the value of ReportType is invalid, zero is returned.
Comments
  Callers of this routine must be running at IRQL PASSIVE_LEVEL.
HidP_SetScaledUsageValue
NTSTATUS
    HidP_SetScaledUsageValue(
    IN HIDP_REPORT_TYPE ReportTYPe,
    IN USAGE UsagePage
    IN USHORT LinkCollection, /*optional*/
    IN USAGE Usage,
    IN LONG UsageValue,
    IN PHIDP_PREPARSED_DATA PreparsedData,
    IN OUT PCHAR Report,
    IN ULONG ReportLength
    );
HidP SetScaledUsageValue takes a signed physical (scaled) number and converts it to the logical, or device, representation and inserts it in a given report.
Parameters
ReportType
  Specifies the type of report provided at Report. ReportType must be one of the following values:
HidP_Input
  Specifies that the report is an input report.
HidP_Output
  Specifies that the report is an output report.
HidP Feature
  Specifies that the report is a feature report.
UsagePage
  Specifies the usage page identifier of the value to be set in the report.
LinkCollection
  Optionally specifies a link collection identifier to distinguish between values that have the same usage page and usage identifiers. If this parameter is zero, LinkCollection will be ignored.
Usage
  Specifies the usage identifier of the value to be set in the report.
Usage Value
  Specifies the physical, or scaled, value to be set in the value for the given report
PreparsedData
  Points to the preparsed data returned for the device when collection information was obtained at initialization.
Report
  Points to a caller-allocated buffer for a report that contains the scaled value to be set.
ReportLength
  Is the size in bytes, of the buffer provided at Report.
Return Value
  Hidp_SetScaledUsageValue returns a HIDP_XXX status code from the following list:
HIDP STATUS SUCCESS
  Indicates that the routine completed successfully.
HIDP STATUS INVALID PREPARSED_DATA
  Indicates the preparsedHID device data provided at PreparsedData is malformed.
HIDP STATUS INVALID_REPORT_LENGTH
  Indicates that the report length provided in ReportLength was not the size expected for a report of the report type specified in ReportType.
HIDP STATUS BAD LOG_PHY_VALUES
  Indicates that the device has an illegal logical or physical value preventing scaling. To set the value call HidP_SetUsageValue instead.
HIDP STATUS NULL
  Indicates the given state of the scaled value data from the device is less than the physical minimum or is greater than the physical maximum and the scaled value has a NULL state.
HIDP STATUS VALUE_OUT OF RANGE
  Indicates the current state of the scaled value data from the device is less than the physical minimum or is greater than the physical maximum.
HIDP STATUS INCOMPATIBLE_REPORT_ID
  Indicates that the value specified by the parameters Usage, UsagePage, and optionally LinkCollection is known. but cannot be set in the data provided at Report because it conflicts with data already in that report. A new report would need to be allocated for this data.
HIDP STATUS USAGE_NOT_FOUND
  Indicates that the usage specifies by the values provided at Usage, UsagePage, and optionally LinkCollection could not be found in the report data provided.
Comments
  This routine automatically handles the setting of the signed bit in the data to be sent to the device.
  Callers of this routine must be running at IRQL<= DISPATCH_LEVEL.
See Also HidP_SetUsageValue
HidP_SetUsages
NTSTATUS
    HidP_SetUsages(
    IN HIDP_REPORT.TYPE ReportType,
    IN USAGE UsagePage,
    IN USHORT LinkCollection, /*optional*/
    IN PUSAGE UsageList,
    IN OUT PULONG UsageLength,
    IN pHIDP_PREPARSED_DATA preparsedData,
    IN OUT PCHAR Report,
    IN ULONG ReportLength
    );
HidP_SetUsages sets takes an array of button state data and sets the button data in a given report.
Parameters
ReportType
  Specifies the type of report provided at Report. ReportType must be one of the following values:
HidP_Input
  Specifies that the report is an input report.
HidP_Output
  Specifies that the report is an output report.

HidP_Feature
Specifies that the report is a feature report.
UsagePage
Specifies the usage page identifier of the buttons to be set in the report~
LinkCollection
Optionally specifies a link collection identifier to distinguish between buttons. If this parameter is zero, LinkCollection is ignored.
UsageList
Points to a caller-allocated buffer that contains an array of button data to be set in the report provided at Report.
UsageLength
Specifies the length, in array elements, of the buffer provided at UsageList. if an error is returned by this routine, this parameter contains the position in the array provided at UsageList where the error was encountered. All previous array entries were successfully set in the report provided at Report.
PreparsedData
Points to the preparsed data returned for the device when, collection information was obtained at initialization.
Report
Points to a caller-allocated buffer for a report that contains the buttons to be set.
ReportLength
Specifies the length, in bytes, of the buffer provided at Report.
Return Value
HidP_SetUsages returns a HiDP_XXX status code from the following list:
HIDP STATUS SUCCESS
Indicates that the routine completed successfully.
HIDP STATUS INVALID_REPORT_TYPE
Indicates that the report type value provided at ReportType was invalid.
HIDP STATUS INVALID_REPORT_LENGTH
Indicates that the report length provided at ReportLength does not match the expected report length for a report of type specified in ReportType.
HIDP STATUS INVALID PREPARSED_DATA
Indicates the preparsedHID device data provided at preparsedData is malformed.
HIDP STATUS BUFFER TOO SMALL
Indicates that the buffer provided at Report was of insufficient size to store all of the buttons being set: This error is also returned when the report does not have enough locations to set all of the buttons. It is necessary to split this request into two reports.
HIDP STATUS INCOMPATIBLE_REPORT_ID
Indicates that the button, at array element specified on return in UsageLength, is a valid button but could not be set in the report provided at Report because of previous buttons already set in that report. A new report would need to be allocated for this button.
HIDP STATUS_USAGE_NOT_FOUND
Indicates that the button, at array element specified on return in UsageLength, is not a valid button for this device and could not be set.
Comments
Callers of this routine must be running at IRQL<= DISPATCH_LEVEL.
See Also
HidP_GetUsages.
HidP_SetUsageValue
NTSTATUS
HidP_SetUsageValue(
IN HIDP_REPORT_TYPE ReportType,
IN USAGE Usagepage,
IN USHORT linkCollection,
IN USAGE Usage,
IN ULONG UsageValue,
IN HIDP_PREPARSED_DATA PreparsedData,
IN OUT PCHAR Report,
IN ULONG ReportLength
);
HidP_SetUsageValue sets a value in a given report.
Parameters
ReportType
Specifies the type of report provided at Report. ReportType must be one of the following values:
HidP_Input
Specifies that the report is an input report.
HidP_Output
Specifies that the report is an output report.
HidP_Feature
Specifies that the report is a feature report.
UsagePage
Specifies the usage page identifier of the value to be set in the report.
LinkCollection
Optionally specifies a link collection identifier to distinguish between values that share the same usage page and usage identifier. If this parameter is zero, LinkCollection is ignored.
Usage
Specifies the usage identifier of the value to be set in the report.
UsageValue
Specifies the data that is to be set in the value for the report provided at report.
PreparsedData
Points to the preparsed data returned for the device when collection information was obtained at initialization.
Report
Points to a caller-allocated buffer for a report that contains the value to be set.
ReportLength
Specifies the length, in bytes, of the buffer provided at Report.
Return Value
HIdP_SetUsageValue returns a HIDP_XXX status code from the following list:
HIDP STATUS_SUCCESS
Indicates that the routine completed successfully.
HIDP STATUS INVALID REPORT_TYPE
Indicates that the report type value provided at ReportType was invalid.
HIDP STATUS_INVALID_REPORT LENGTH
Indicates that the report length provided at ReportLength does not match the expected report length for a report of type specified in ReportType.
HIDP STATUS INVALID_PREPARSED_DATA
Indicates the preparsed HiD device data provided at preparsed Data is malformed.
HIDP STATUS USAGE_NOT_FOUND
Indicates that no value that matches the given usage, usage page, and link collection could be found in this report.
HIDP STATUS INCOMPATIBLE_REPORT_ID
Indicates that the value specified by the parameters Usage, UsagePage, and optionally LinkCollection is known, but cannot be set in the data provided at report. A new report would need to be allocated for this value.

HIDP STATUS USAGE_NOT_FOUND
  Indicates that the value specified by the parameters Usage, UsagePage, and optionally LinkCollection could not be set in the report because it is invalid.
Comments
  This routine does not automatically handle the sign bit, Callers must either manually set the sign bit, at the position provided in the HIDP_VALUE_CAPS structure for this value, or call HidP_SetScaledUsageValue. Callers of this routine must be running at IRQL<=DiSPATCH, LEVEL.
See Also
HidP_SetScaledUsageValue_HIDP_VALUE_CAPS
HidP_SetUsageValueArray
NTSTATUS
    HidP_SetUsageValueArray(
    IN HIDP_REPORT . . . TYPE ReportType,
    IN USAGE UsagePage,
    IN USHORT LinkCollection, /*optional*/
    IN USAGE Usage,
    IN PCHAR Usage Value,
    IN USHORT Usage ValueByteLength,
    IN pHIDP_PREPARSED_DATA PreparsedData,
    OUT PCHAR Report,
    IN ULONG ReportLength
    );
HidP_SetUsageValueArray sets a series of values into a report for a usage which has more than one data item for the single usage.
Parameters
ReportType
  Specifies the type of report provided at Report. ReportType must be one of the following values:
HidP_Input
  Specifies that the report is an input report.
HidP_Output
  Specifies that the report is an output report.
HidP_Feature
  Specifies that the 'report is a feature report.
UsagePage
  Specifies the usage page identifier of the data items to be set in the report.
LinkCollection
  Optionally specifies the link collection identifier of the data items to be set in the report.
Usage
  Specifies the usage identifier of the data items to be set in the report.
Usage Value
  Points to a caller-allocated buffer that contains the data to be set in the report provided at Report. The correct length for this buffer can be found by multiplying the ReportCount and BitSize fields of the HIDP_VALUE_CAPS structure for this value and rounding the resultant value up to the nearest byte.
UsageValueByteLength
  Specifies the length, in bytes, of the buffer provided at UsageValue
PreparsedD ta
  Points to the preparsed data returned for the device when collection information was obtained at initialization.
Report
  Points to a caller-allocated buffer for a report to hold the data items for transmission to the device.
ReportLength
  Specifies the length, in bytes, of the buffer provided at Report.

Return Value
  HidP_SetUsageValueArray returns a HIDP_XXX status code from the following list:
HIDP_STATUS_SUCCESS
  Indicates that the routine completed successfully.
HIDP STATUS INVALID PREPARSED_DATA
  Indicates thepreparsedHID device data provided at preparsedData is malformed.
HIDP STATUS INVALID REPORT_TYPE
  Indicates that the report type.value provided at ReportType was invalid.
HIDP STATUS INVALID REPORT_LENGTH
  Indicates that the report length provided at ReportLength does not match the expected report length for a report of type specified in ReportType.
HIDP STATUS NOT_VALUE_ARRAY
  Indicates that the requested usage has only one data item. To set the data, clients should call HidP_SetUsageValue or Hidp_SetScaledUsageValue instead.
HIDP STATUS INCOMPATIBLE_REPORT_1B
  Indicates that the data items specified by the parameters Usage, UsagePage, and optionally LinkCollection is known, but cannot be set in the data provided at Report. A new report would need to be allocated for this value.
HIDP STATUS_USAGE_NOT_FOUND
  Indicates that the data items specified by the parameters Usage, UsagePage, and optionally LinkCollection could not be set in the report because a usage matching those parameters could not be found for this top-level collection.
Comments
  Callers of this routine must be running at IRQL<= DISPATCH_LEVEL.
See Also
HidP_SetScaledUsageValue, HidP_SetUsageValue
HidP_TranslateUsagesTo18042ScanCode
  This routine is to be determined.
HidP_UsageListDifference
NTSTATUS
    HidP_UsageListDifference(
    IN PUSAGE PreviousUsagList,
    IN PUSAGE CurrentUsageList,
    OUT PUSAGE BreakUsageList,
    OUT PUSAGE MakeUsageList,
    IN ULONG UsageListLength
    );
HidP_UsageListDifference compares and provides the differences between two lists of buttons.
Parameters
Previous Usagelust
  Points to the older button list to be used for comparison.
CurrentUsageList
  Points to the newer button list to be used for comparison.
BreakUsageList
  Points to a caller-allocated buffer that, on return, contains the buttons that are set in the older list, provided at PreviousUsageList, but not set in the new list, provided at CurrentUsageUst.
MakeUsageList
  Points to a caller-allocated buffer that, on return, contains the buttons that are set in the new list, provided at CurrentUsageList, but not set in the old list, provided at Previous UsageList.
UsageListLength
  Specifies the length, in array elements, of the buffers provided at CurrentUsageList and PreviousUsageList.
Return Value HidP_UsageLlstDifference returns HIDP_STATUS_SUCCESS.

Comments

Callers of this routine must be running at IRQL PASSIVE_LEVEL.

HID Structures for Clients

This chapter describes system-defined structures 'specific to Windows NT Human Input Device (HID) drivers and clients. See Part I for information about general Windows NT system-defined structures that are not described here. See Chapter X for system structures specific to USB client drivers.

Drivers can use only those members of structures that are described here. All undocumented members of these structures are reserved for system use.

HIDD CONFIGURATION

This structure is to be determined.

HID_COLLECTION_INFORMATION typeder struct_HID_COLLECTION INFORMATION {
    ULONG DescriptorSize;
    BOOLEAN Polled;
}HID_COLLECTION_INFORMATION, *PHID_COLLECTION_INFORMATION;

HiD_COLLECTION_INFORMATION is used by HID clients to hold information about a HID collection descriptor.

Members

DescriptorSize

Is the size, in bytes, required to hold a collection descriptor for this device.

Polled

Indicates that this device is on a non-USB bus and the data is provided in a polled manner.

Comments

This structure is used by kernel mode HID clients to retrieve the preparsed data for the HID device.

HIDP BUTTON CAPS

```
typedef struct_HIDP_BUTTON_CAPS
{
USAGE        UsagePage;
UCHAR        ReportID;
.USHORT      BitField;
USHORT       LinkCollection;
USAGE        LinkUsage;
USAGE        LinkUsagePage;
BOOLEAN      IsRange;
BOOLEAN      IsStringRange;
BOOLEAN      IsDesignatorRange;
BOOLEAN      IsAbsolute;
.union
{
   struct
   {
   USAGE     UsageMin,        UsageMax;
   USHORT    StringMin,       StringMax;
   USHORT    DesignatorMin,   DesignatorMax;
   .} Range;
   struct
   USAGE     Usage;
   USHORT    StringIndex;
   USHORT    DesignatorIndex;
   } NotRange;
}
} HIDP_BUTTON_CAPS, *PHIDP_BUTTON_CAPS;
```

HIDP_BUTEON_CAPS is used by HID clients to hold the capability data for a button on a HID device.

Members

UsagePage..
Specifies the usage page identifier for this button.

ReportID

Specifies theidenti~erofthe'rePortto which this button belongs.

BitField

Is the bitfield, as defined by the HID specification, that describes the behavior of this button. This is the raw data for the bitfield found after the main item in the HID descriptor. The bit meanings from this bitfield are further parsed into BOOLEAN values elsewhere in this structure.

LinkCollection

Specifies a unique identifier to identify the link collection in which this control is contained. A value of zero in this member indicates that the control is contained in the top level collection. This value of this member is also the index into an array of HIDp_LINK_COLLECTION_NODE structures returned from Hidp_GetLinkCollectionNodes.

LinkUsage

Specifies the usage identifier for the link collection that this button belongs to. If LinkCollection is zero, this member is the usage identifier for the top level collection.

LinkUsagePage

Specifies the usage page identifier for the link collection that this button belongs to. If LinkCollection is zero, this member is the usage page identifier for the top level collection.

IsRange

Specifies, if TRUE, that this button has a range of usage identifiers that span the values between Range.UsageMin and Range.UsageMax. if this member is FALSE, the single usage identifier for this button is provided in NotRange.Usage.

IsStringRange

Specifies, if TRUE. that this button has a range of string, index identifiers that span the values between Range.StringMin and Range.StringMax. If this member is FALSE, the single string index identifier for this button is provided in NotRange.StringIndex.

IsDesignatorRange

Specifies, if TRUE, that this button has a range of designator identifiers that span the values between Range.DesignatorMin and Range. DesignatorMax. If this member is FALSE, the single designator identifier for this button is provided in NotRange.DesignatorIndex.

IsAbsolute

Specifies, if TRUE, that this button provides absolute data and not the change in state from the last value.

Range.UsageMin

Specifies the lower value of a range of usage identifiers that is bounded at the upper edge by Range.UsageMax.

Range.UsageMax

Specifies the upper value of a range of usage identifiers that is bounded at the lower edge by Range,UsageMin.

Range.StringMin

Specifies the lower value of a range of string identifiers that is bounded at the upper edge by Range.StringMax.

Range. StringMax

Specifies the upper value of a range of string identifiers that is bounded at the lower edge by Range.StringMin.

Range. DesignatorMin

Specifies the lower value of a range of designator identifiers that is bounded at the upper edge by Range. DesignatorMax.

Range.DesignatorMax

Specifies the upper value of a range of designator identifiers that is bounded at the lower edge by Range. DesignatorMin.

Figure 8:
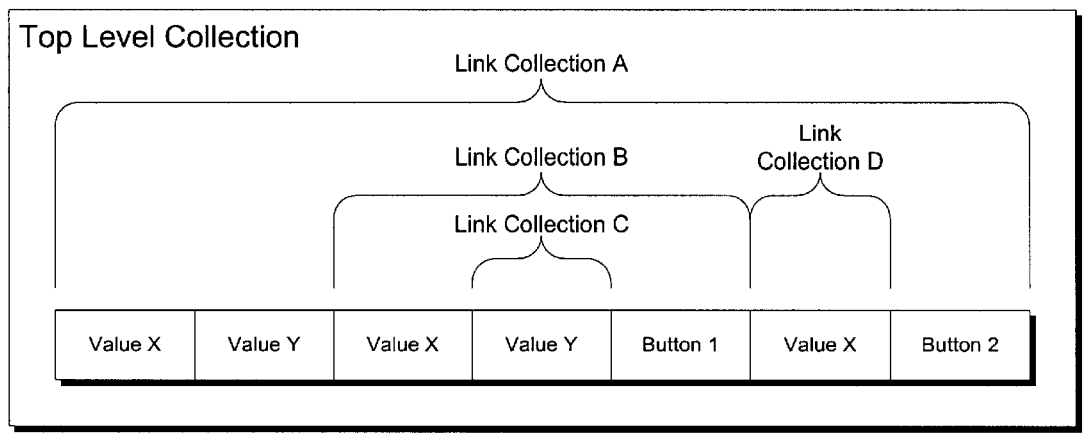
FIG. 8 is a block diagram illustrating link collection nodes.

Not Range.Usage
    Specifies the usage identifier for this button.
Not Range.StringIdentifier
    Specifies a string index identifier for this button.
Not Range.DesignatorIdentifier
    Specified a designator identifier for this button.
Comments
    HIDP BUTTON_CAPS is used by HID to deliver and hold capability information about buttons for a HID top level collection-To obtain the button capability, clients call HidP_GetButtonCaps and HidP_GetSpecificButtonCaPs. Callers of those routines allocate buffers of HiDP_BUTTON_CAPS structures to be used as a parameter to those routines. The correct length of the buffers required can be found in the HiDP_CAPS structure that is filled in by HidP_GetCaps.
See HiDP VALUE CAPS for information on structures that hold capability information about non-button data.
See Also
HidP_GetButtonCaps, HidP_GetCaps, HidP_GetSpecificButtonCaps, HIDP_CAPS
HIDP CAPS
typeder struct_HIDP_CAPS{
    USAGE Usage;
    USAGE UsagePage;
    USHORT"InputRepOrtByteLength;
    USHORT OutputReportByteLength;
    USHORT FeatureReportByteLength;
    USHORT NumberLinkCollectionNodes;
    USHORT NumberInputButtonCaPs;
    USHORT NumberInputValueCaps;
    USHORT NumberOutputButtonCaPs;
    USHORT NumberOutputValueCaps;
    USHORT NumberFeatureButtonCaPs;
USHORT NumberFeatureValueCaps;
}HIDP CAPS, *PHIDP_CAPS
HIDP_CAPS is used by HID clients to hold the capabilities of a HID device.
Members
Usage
    Specifies the specific class of functionality that this device provides. This value is dependent and specific to the value provided in UsagePage. For example, a keyboard could have a UsagePage of HID_USAGE_PAGE_SENERIC and a Usage of HID USAGEGENERiC_KEYBOARD.
UsagePage
    Specifies the usage page identifier for this top-level collection.
InputReportByteLength
    Specifies the maximum length, in bytes, of an input report for this device including the report ID which is unilaterally prepended to the device data.
OutputReportByteLength
    Specifies the maximum length, in bytes, of an output report for this device including the report ID which is unilaterally prepended to the device data.
FeatureReportByteLength
    Specifies the maximum length, in bytes, of a feature report for this device including the report ID which is unilaterally prepended to the device data.
NumberLinkCollectionNodes
    Specifies the number of HIDp_LINK_COLLECTION_NODE structures that are returned for this top-level collection by HiDP_GetLinkCollectionNodes.
NumberInputButtonCaps
    Specifies the number of input buttons.
NumberInputValueCaps
    Specifies the number of input values.
NumberOutputButtonCaps
    Specifies the number of output buttons.
NumberOutputValueCaps
    Specifies the number of output values.
NumberFeatureButtonCaps
    Specifies the number of feature buttons.
NumberFeatureValueCaps
    Specifies the number of feature values.
Comments
HIDP_CAPs holds the parsed capabilities and data maximums returned for a device from HidP_GetCaPs.
See Also
HidP_GetCaps, HidP_GetLinkCollectionNodes
HIDP_LINK_COLLECTION_NODE
typeder struct HIDP_LINK_COLLECTION_NODE
    USAGELinkUsage;
    USAGE LinkUsagePage;
    USHORTParent;
    USHORT NumberOfChildren;
    USHORT NextSibling;
    USHORT FirstChild;
}HIDP LINK COLLECTION NODE, *pHIDp_LINK_COLLECTION_NODE;
HIDP_LINK_COLLECTION_NODE structures hold descriptive data about each link collection that is part of a top level collection.
Members
LinkUsage
    Specifies the usage identifier for the link collection described by this structure.
LinkUsagePage
    Specifies the usage pace identifier for the link collection described by this structure.
Parent
    Specifies the index, into the array of HIDP_LINK_COLLECTION_NODE structures returned by HIDP_GetLinkCollectionNodes, of the parent of this link collection. If the link collection has no parent, this value will be zero.
NumberOfChildren
    Specifies the number of link collections that are contained within the link collection described by this structure.
NextSibling
    Specifies the index, into an array of HIDp_LINK~COLLECTION_NODE structures returned by HidP_GetLlnkCollectionNodes, of the next link collection that is at the same level in the hierarchy of link collections as this link collection.
FirstChild
    Specifies the index, into an array of HIDP LINK~OELECTION_NODE structures returned by HidP_GetLinkCollectionNodes, of the next link collection that is a child of this collection that is not a sibling of another link collection at the same level.
Comments
    See FIG. 8, link collection nodes.
    A HIDP LINK COLLECTION NODE structure corresponds to a HID-defined link collection and describes each subcollection in a top-level collection. A top-level collection can have any number of subcollections or none. Defined relationships among link collections depend on their positions in a top-level collection as well as their position among other link collections. At most, a link collection can have the following relationships to other link collections within the same top-level collection:

One parent

Any number of children

A sibling

A first child

A top level collection can have zero or more children, of which only one can be considered a first child. Consider the preceding diagram as an example of a top level collection with link collections.

The top level collection has a total of four link collections contained within it. However, it does not have four children. The top level collection has one child, link collection A. Link collection A has two children, link collection B and link collection D. Assuming the collection is parsed from left to right in the above diagram, link collection B is encountered first. This makes it the first child of link collection A for the time being. Ignoring for the moment that link collection B has children, link collection D is encountered next Link collection B now becomes the sibling of link collection D and D now becomes the first child of A. Siblings are defined as the next link collection encountered that is not a child of a different parent link collection. Link collection C is a child of link collection B. This makes link collection B the parent of C in the same manner as A is the parent of B.

A first child, the member FirstChild in a HIDP LINK . . . COLLECTION_NODE structure, is a link collection that is the last child encountered for a specific parent link collection and no collection claims it as a sibling. In the preceding example, link collection D is the first child of link collection A because no collection has it as a sibling. In the same manner, link collection C is the first child of B.

The next sibling, the member NextSibling in a HIDP LINK. COLLECTION_NODE structure, is the link collection that just previous in the order of parsing. In the example, the next sibling for link collection D is link collection B. Link collections B and A have no next sibling.

When HidP GetLinkOollectionNodes returns an array of Dp_LINK._COLLECTION_NODE structures it uses the members of each structure to desddbe the relationships of the link collections. When an index is returned in a structure it is the index into the array such that it can be used to retrieve the link collection data for that relationship. The link collection index is the same value as is found in the LinkCollection member of the HIDP_VALUE._CAPS and HIDP_BUTTON_CAPS structures.

The following code is an example of Using a link Collection, mode index to find the first child of link collection seven HIDP_LINK_COLLECTION_NODE Collection[10];

HIDP_LINK_COLLECTION_NODE Nodel;

Nodel=Collection [Collection.FirstChild [7]];

See Also

HidP_GetLinkCollectionNodes, HIDP_BUTTON_CAPS, HIDP_VALUE_CAPS

| HIDP VALUE CAPS | |
|---|---|
| typedef struct_HIDP_VALUE_CAPS | |
| USAGE | UsagePage; |
| UCHAR | ReportID; |
| USHORT | BitField; |
| USHORT | LinkCollection; |
| USAGE | LinkUsage; |

| -continued | | |
|---|---|---|
| HIDP VALUE CAPS | | |
| USAGE | LinkUsagePage; | |
| BOOLEAN | IsRange; | |
| BOOLEAN | IsStringRange; | |
| BOOLEAN | IsDesignatorRange; | |
| BOOLEAN | IsAbsolute; | |
| BOOLEAN | HasNull; | |
| USHORT | BitSize; | |
| USHORT | ReportCount; | |
| LONG | LogicaiMin, | LogicalMax; |
| LONG | PhysicaiMin, | PhysicalMax; |
| union | | |
| { | | |
| struct. | | |
| { | | |
| USAGE' | UsageMin, | UsageMax; |
| USHORT | StringMin, | StringMax; |
| USHORT | DesignatorMin, | DesignatorMax; |
| } Range; | | |
| struct | | |
| { | | |
| USAGE | Usage; | |
| USHORT | Stringindex; | |
| USHORT | Designatorindex; | |
| } NotRange; | | |
| }; | | |
| } HIDP VALUE CAPS, *PHIDP_VALUE_CAPS; | | |

Figure 9:
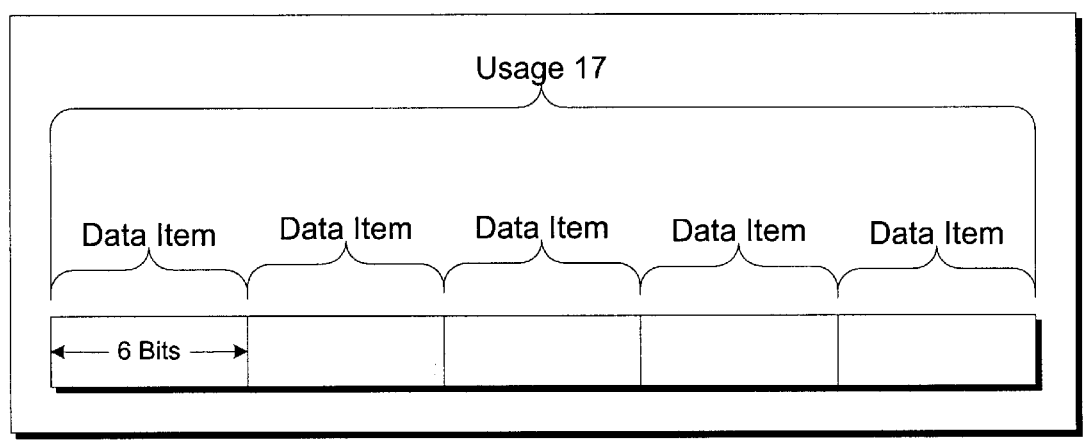
FIG. 9 is a block diagram illustrating usage arrays.

HIDP_VALUE_CAPS is used by HID_Clients to hold the capability data for, a value from a HID device.
Members
UsagePage
Specifies the usage page identifier for this value
ReportID
Specifies the report ID in which this value is contained.
BitField
Is the bitfield, as defined by the HID specification, that describes the behavior of this value. This is the raw data for the bitfield found after the main item in the HID descriptor. The bit meanings from this bitfield are further parsed into BOOLEAN values elsewhere in this structure.
LinkCollection
Specifies a unique identifier to distinguish two controls, within a collection, that have the same usage page and usage identifiers.
LinkUsage
Specifies the usage identifier for the link collection that this value belongs to. If LinkCollection is zero, this member is the usage identifier for the top level collection.
LinkUsagePage.
Specifics the usage page identifier for the link collection that this Value belongs to. If LinkCollection is zero, this member is the usage page identifier for the top level Collection.
IsRange
Specifies, if TRUE, that this value has a range of usage identifiers that span the members RangeUsageMin and Range.UsageMax. If this member is FALSE, the single usage identifier for this value is provided in Not Range-.Usage.
IsStringRange
Specifies, if TRUE, that this value has a range of string index identifiers that span the members Range.StringMin and Range.StringMax-If this member is FALSE, the single string index identifier for this value is provided in Not Range.Stringlndex.
IsDesignatorRange
Specifies, if TRUE, that this value has a range of designator identifiers that span the members Range.DesignatorMin and Range. DesignatorMax. If this member is FALSE, the single designator identifier for this value is provided in Not Range.DesignatorIndex.
IsAbsolute
Specifies, if TRUE, that this value provides absolute data as opposed to the change from the last value.
HasNull
Specifies that this value has a condition where the data in this value is not meaningful. When this occurs, HIDP_STATUS_NULL is returned when the value is retrieved.
BitSize
Specifies the number of bits dedicated within a report to a single instance of this value. If ReportCount is greater than one, this bit size is size of each data item, not the size of all data items.
ReportCount
Specifies the number of data items that the usage identifier, described by this structure, contains.
LogicalMin
Specifies the lowest, or minimum, signed number that this value will report.
LogicalMax
Specifies the highest, or maximum, signed number that this value will report.
PhysicalMin
Specifies the lowest, or minimum, signed number that this value will report after scaling is applied to the logical value.
PhysicalMax
Specifies the highest, or maximum, number that this value will report after scaling is applied to the logical value.
Range.UsageMin
Specifies the lower value of a range of usage identifiers that is bounded at the upper edge by Range.UsageMax.
Range. UsageMax
Specifies the upper value of a range of usage identifiers that is bounded at the lower edge by Range.UsageMin.
Range.StringMin
Specifies the lower value of a range of string identifiers that is bounded at the upper edge by Range.StringMax.
Range.StringMax
Specifies the upper value of a range of string identifiers that is bounded at the lower edge by Range. StringMin.
Range.DesignatorMin
Specifies the lower value. of a range of designator identifiers that is bounded at the upper edge by Range.DesignatorMax.
Range.DesignatorMax
Specifies the upper value of a range of designator identifiers that is bounded at the lower edge by Range.DesignatorMin.
Not Range.Usage
Specifies the usage identifier for this value.
NotRange. StringIdentifier
Specifies a string index identifier for this value.
NotRange.DesignatorIdentifier
Specifies a designator identifier for this value.
Comments
HIDP VALUE CAPS is used by HID to deliver and hold capability information about values in a HID top-level collection. HID clients that use the HidP_Xxx routines allocate an array of these structures as a buffer for HidP_GetValueCaps and HidP_GetSpecificValueCap'to obtain information about values in a top level collection.
See HIDP_BUTTON_CAPS for information on structures that hold capability information about button data.
See FIG. 9, usage arrays.
The member ReportCount indicates how many data items are present for each usage that is described by an instance of this structure. In the FIG. 9, an example usage layout is given. In this case the device has reported that for usage seventeen, it has five data items each six bits long. ReportCount for this structure would equal five.
If ReportCount is equal to one, clients access the data for the usage by calling HidP_GetUsageValue or HidP GetScaledUsageValue. However, if ReportCount is greater than one, then HidP GetUsageValue and Hidp_GetScaledUsageValue will not return data except for the first item. Clients should call Hidp_GetUsageValueArray instead.
See Also
HidP_GetSpecificValueCaps, HidP_GetUsageValue, HidP_GetUsageValueArray, HidP_GetValueCaps
USAGE_AND_PAGE
typedef struct_USAGE_AND_PAGE {
USAGE Usage;
USAGE UsagePage;
}USAGE_AND_PAGE, *PUSAGE_AND_PAGE
USAGE_AND_PAGE is used by HID clients when obtaining the status of buttons to hold the usage page and usage of a button that is down.
Members Usage
Specifies the usage identifier within the usage page specified by UsagePage of a button that is down.
UsagePage
Specifies the usage page identifier of a button that is down.
Comments
Clients use USAGE_AND_PAGE with HidP_GetUsagesEx to obtain both the usage page and usage identifiers of each button that is down.
See Also
HidP_GetUsagesEx
HID Support Routines for MiniDrivers
Windows NT human input device (HID) minidrivers can cell the following routines to support HID devices. Routines in this chapter are listed in alphabetical order.
HidRegisterMinidriver
NTSTATUS
HidRegisterMinidriver(
IN PHID_MINiDRiVER_REGISTRATION MinidriverRegistration
);
HidRegisterMinidriver is called by HiD minidrivers, during their initialization, to register with the HID class services.
Parameters
MinidriverRegistration
Points to a caller-allocated buffer that contains an initialized HID_MINIDRiVER_REGISTRATION structure for the minidriver.
Return Value
HidRegisterMinidriver returns one of the following NTSTATUS codes:
STATUS_SUCCESS
Indicates that the routine completed without error and the minidriver is now registered with the HID class driver.
STATUS INSUFFICIENT_RESOURCES
Indicates that there was insufficient memory for the system to register the minidriver.
STATUS BEVISION_MISMATCH
Indicates that the HID revision number provided in MinidriverRegistration->Revision is not supported by this version of the HID class driver.
Comments
Before calling this routine, minidrivers must initialize all fields of the HiD MINiDRIVER_REGiSTRATION structure that is provided at MinidriverRegistration. See HIDEMiNiDRIVER_REGISTRATION for details on these fields.

Callers of this routine must be running at IRQL<DISPATCH_LEVEL.
See Also
HID_MINIDRIVER_REGISTRATION
HID Structures for Minidrivers This chapter describes system-defined structures specific to Windows NT Human Input Device (HID) minidrivers. See Part I for information about general Windows NT system-defined structures that are not described here. See Chapter X for system structures specific to USB client drivers. Drivers can use only those members of structures that are described here. All undocumented members of these structures are reserved for system use.

Structures described in this structure arc in alphabetical order.
HID DEVICE EXTENSION
typedef struct HID DEVICE EXTENSION {
    PDEVICE OBJECT physicalDeviceObject;
    PDEVICE_OBJECT NextDeviceObject;
    PVOID MiniDeviceEXtension;
}HID DEVICE EXTENSION, *PHID_DEVICE_EXTENSION HID_DEVICE_EXTSNSION is the HID class defined structure that is used by all minidrivers for their device extension in their functional device object.
Members
PhysicalDeviceObject
    Points to the physical device object for this HID minidriver.
NextDeviceObject
    Points to the next device object in the chain of drivers of which the minidriver is a part.
MiniDeviceExtension
    Points to the minidriver specific portion of the device extension.
Comments
    A HID minidriver functional device Objects device extension will always be in a format corresponding to this structure. When the device extension is initialized for the device object, the members of this structure will be initialized by the class driver. The minidriver can use the memos pointed to by MiniDeviceExtension for its own device specific data area. Minidrivers should only reference and not change any of the data except in the memo~at MiniDeviceExtension.
HiD_MiNIDRIVER_REGISTRATION
typedef struct HID MINIDRIVER_REGISTRATION
    ULONG Revision;
    PDRIVER OBJECT, DriverObject;
    PUNICODE STRING RegistryPath;
    ULONG DeviceExtensionSize;
    BOOLEAN DevicesArePolled;
}HID MINIDRIVER REGISTRATION, *pHID_MINIDRIVER_REGISTRATION;
    HID_MINIDRIVER REGISTRATION is used by HID minidrivers to describe the minidriver when registered with the HID class driver.
Members
Revision
    Specifies the HID version that this minidriver supports.
DriverObject
    Points to the DRIVER_OBJECT for the minidriver.
RegistryPath
    Points to the registry path for the minidriver.
DeviceExtensionSize
    Specifies the length, in bytes. that the minidriver requests for a device extension.
DevicesArePolled
    Specifies that the devices on the bus that this minidriver supports must be polled in order to obtain data from the device.
Comments
    Clients fill in an instance of this structure to be used as a parameter to HidRegisterMinidriver. The structure must be zero-initialized before clients set members of this structure. Clients should set the members DriverObject and RegistryPath to the driver object and registry path parameters that are passed to the minidriver as system-supplied parameters to its DriverEntry routine. Revision should be set to HID_REVISION.
See Also
HidRegisterMinidriver
HID_XFER_PACKET

```
typeder struct HID_XFER_PACKET {
    PUCHAR       reportBuffer;
    ULONG        reportBufferLen;
    UCHAR        reportId;
```

}HID_XFER_PACKET, *PHID_XFER_PACKET
    This structure is used by HID miniclass drivers to obtain the parameters and settings for data transfer requests from the class driver.
Members
reportBuffer
    Points to a buffer that is provided to the miniclass driver to transfer data.
reportBufferLen
    Specifies the length of the buffer at reportBuffer.
reportId
    Optionally specifies the report ID of the report contained at reportBuffer.
Comments
    This structure is used by the HID class driver to submit write report and set feature requests to HID miniclass drivers. For information on when this structure is used, Is miniclass driver writer should see Part II of this guide for the I/O requests and I/O control codes that miniclass drivers must support.
I/O Requests for HID Minidrivers
    Windows NT© HID minidrivers are implemented in a variant of the classminiClass driver model:
    A bus-specific miniclass driver that implements the bus-specific semantics of HID devices for the bus that the minidriVer is written for.
    A Microsoff-supplied class driver that implements the general implementation of HID data reports and descriptors.
    Microsoft supplies a class driver that takes HID data that the miniclass driver provides from the bus and exposes support routines to HID clients to extract specific instances of HID data, set HID data in a report, and provide general information about the device.
    This section describes the IRP and IOCTL requests that miniclass drivers must support in order to function correctly in tandem with the class driver supplied by Microsoft.
12.1 HID Minidriver IlO Requests
    Hid miniclass drivers support only one IRP major function code, that being IRP MJ INTERNAL DEVICE CONTROL. All communication between the HID class driver and the HID miniclass driver is done through the use of I/O control codes and IRP MJ INTERNAL_DEVICE. CONTROL:

IRP MJ iNTERNALDEVICE CONTROL
Operation
Is determined by the I/O control code set at Parameters.DeviceIoControl.IoControlCode is the miniclass drivers I/O stack location of the IRP.
When Called
A Win32 application has called a HID support routine, or a kernel mode client has set up such a request and transmitted it to the class driver.
I/O Status Block
Is determined by, the operation as specified in the I/O control code set at Parameters.DeviceIoControl.IoControlCode. This code will either be STATUS_SUCCESS or an appropriate STATUS_XXX value. For most operations, the set of possible STATUS_XXX values includes those propagated from a call to a kernel mode support routine or lower-level driver and/or those determined to be appropriate by the driver designer. For specifics on the setting of the I/O status block by the miniclass driver, see the specific I/O control reference in section 12.2 of this chapter.

2.2 HID Minidriver IlO Control Codes
Is All I/O control codes that HID miniclass drivers must support use varying methods of transmitting their data buffers. Consequently, the input or output data buffers locations will be specified for each I/O control code in its description. All of the following I/O control codes should be considered to be mandatory and are sent to the driver in IRPs with the major function code of IRP MJ INTERNAL_ DEVICE_CONTROL.

IOCTL GET PHYSICAL DESCRIPTOR
This I/O control code is not currently used and is to be determined.

IOCTL HID ACTIVATE DEVICE
Operation
Causes the device to begin operation and accepting requests.
Input
Parameters.DeviceIoControl.Type3InputBuffer contains the collection identifier, as a ULONG value, of the collection to be started.
Output
None.
I/O Status Block
Miniclass drivers that carry out the I/O to the device set the following fields of Irp.IoStatus:
Information is set to zero
Status is set to STATUS_SUCCESS if the transfer completed without error.
Otherwise, it is set to an appropriate NTSTATUS error code.
Miniclass drivers that call other drivers with this iRP to carry out the I/O to their device should ensure that the Information field of the status block is zero and: not alter the contents of the Status field.

IOCTL HID CLOSE COLLECTION
This I/O control code is not currently used and is to be determined.

IOCTL HID,DEACTIVATE=DEVICE:
Operation
Causes the device to stop accepting requests and shut down operation.
Input
Parametem.DeviceIoControl.TYPe3InPutBuffer contains the collection identifier, as a ULONG value, of the collection that is being shut down.

Output
None.
I/O Status Block
Miniclass drivers that carry out the I/O to the device set the following fields of Irp.IoStatus:
Information is set to zero
Status is set to STATUS_SUCCESS if the transfer completed without error.
Otherwise, it is set to an appropriate NTSTATUS error code.
Miniclass drivers that call other drivers with this IRP to carry out the I/O to their device should ensure that the Information field of the status block is zero and not alter the contents of the Status field.

IOCTL HID GET DEVICE DESCRIPTOR
Operation
Retrieves the HID device descriptor.
Input
Parameters.DeviceIoControl.OutputBufferLength contains the length of the system-resident buffer provided at Irp->UserBuffer.
Output
The miniclass driver fills in the class driver-supplied system-resident buffer provided at Irp->UserIBuffer with the device descriptor.
I/O Status Block
Miniclass drivers that carry out the I/O to the device set the following fields of Irp.IoStatus:
Information is set to the number of bytes transferred from the device
Status iS set to STATUS_SUCCESS if the transfer completed without error.
Otherwise, it is set to an appropriate NTSTATUS error code.
Miniclass drivers that call other drivers with this IRP to carry out the I/O to their device should ensure that the Information field of the status block is correct and not alter the contents of the Status field.

IOC TL HID GET FEATURE
Operation
Obtains a feature report from the device.
Input
Irp->UserBuffer points to a HID XFERPACKET structure the contains the parameters and pointer to a buffer for obtaining the feature report. The following members are used:
reportBuffer points to a resident buffer that the miniclass driver uses to return the feature packet
reportBufferLen contains the length of the buffer provided at reportBuffer
reportId contains the report identifier, for this collection, of the feature report to be retrieved
Output
Miniclass drivers fill in the Irp->UserIBuffer->reportBuffer with the feature report obtained from device.
I/O Status Block
Miniclass drivers that carry out the I/O to the device set the following fields of Irp.IoStatus.
Information is set to the number of bytes transferred from the device
Status is set to STATUS_SUCCESS if the transfer completed without error.
Otherwise, it is set to an appropriate NTSTATUS error code.
Miniclass drivers that call other drivers with this IRP to carry out the I/O to their device should ensure that the Information field of the status block is correct and not alter the contents of the Status field.

IOCTL HID GET REPORT DESCRIPTOR

Operation
   Obtains the report descriptor for the HID device.
Input
   Parameters.DeviceloControl.OutputBufferLength specifies the length, in bytes, of the locked-down buffer at Irp->UserBuffer.
Output
   The miniclass driver fills the buffer at Irp->UserBuffer with the report descriptor.
I/O Status Block
   Miniclass drivers that carry out the I/O to the device set the following fields of irp.loStatus:
      Information is set to the number of bytes transferred from the device
      Status is set to STATUS._SUCCESS if the transfer completed without error.
   Otherwise, it is set to an appropriate NTSTATUS error code.
   Otherwise, the miniclass driver should ensure that the information field of the status block is correct in the completed IRP but the miniclass driver should not alter the contents of the Status field.
IOCTL HID GET STRING
Operation
   Returns an human-readable string describing the HID device.
Input of the locked-down
   Parameters.DeviceloControl. InputBufferLength specifies the length, in bytes, buffer at Irp->UserBuffer.
Output
   The miniclass driver fills the buffer at Irp->UserBuffer With the_requested String.
I/O Status Block
   Miniclass drivers that carry out the I/O to the device set the following fields of Irp.loStatus:
      information is set to the number of bytes transferred from the device
      Status is set to STATUS_SUCCESS if the transfer completed without error.
   Otherwise, it is set to an appropriate NTSTATUS error code.
   Otherwise, the miniclass driver should ensure that the Information field of the status block is correct in the completed IRP but the miniclass driver should not alter the contents of the Status field.
IOCTL HID OPEN COLLECTION
   This I/O control code is not currently used and is to be determined.
IOCTL HID READ REPORT
Operation
   Return a report from the device into a class driver-supplied buffer.
Input
   Parameters.DeviceloControl,InputBufferLength contains the size of the buffer provided at Irp->UserBuffer.
Output
   The miniclass driver fills the system-resident buffer pointed to by Irp->UserBuffer with the report data retrieved from the device.
I/O Status Block Miniclass drivers that carry out the I/O to the device set the following fields of Irp.loStatus:
      Information is set to the number of bytes transferred from the device
      Status is set to STATUS_SUCCESS if the transfer completed without error.
   Otherwise, it is set to an appropriate NTSTATUS error code.
      Miniclass drivers that call other drivers with this IRP to carry out the I/O to their device should ensure that the Information field of the status block is correct and not alter the contents of the Status field.
IOCTL HID SET FEATURE
Operation
   Sends a feature report packet to a HID device.
Input
   Irp->UserBuffer points to a HID_XFER PACKET structure the contains the parameters pointer to a buffer containing the feature report. The following members are used:
      reportBuffer points to a buffer containing the report to send to the device
      reportBufferLen contains the length, in bytes, of the buffer provided at reportBuffer
      reportId contains the report identifier, for this collection, of the feature report to be retrieved
Output
   None
I/O Status Block
   Miniclass drivers that carry out the I/O to the device set the following fields of Irp.loStatus:
      Information is set to the number of bytes transferred to the device
      Status is set to STATUS_SUCCESS if the transfer completed without error.
   Otherwise, it is set to an appropriate NTSTATUS error code.
      Miniclass drivers that call other drivers with this IRP to carry out the I/O should ensure that the Information field of the status block is correct and not alter the contents of the Status field.
IOCTL HID WRITE REPORT
Operation
   Takes a class driver-supplied report and transmit it to the device.
Input
   Irp->UserBuffer points to a HID XFER_PACKET structure the contains the parameters and report to be transmitted to the device. The following members are used:
      reportBuffer points to a resident buffer containing the data to be sent to the device
      reportBufferLen contains the length of the buffer provided at reportBuffer
      reportId contains the report identifier, for this collection, of the report data to be written to the device
Output
   None
I/O Status Block
   Miniclass drivers that cam/out the 110 to the device set the following fields of Irp.loStatus:
      Information is set to the number of bytes transferred to the device
      Status is set to STATUS_SUCCESS if the transfer completed without error.
   Otherwise, it is set to an appropriate NTSTATUS error code.
      Miniclass drivers that call other drivers with this IRP to carry out the I/O should ensure that the Information field of the status block is correct and not alter the con. Tents of the status field.

What is claimed is:

1. A computer system comprising:
   a device driver that provides HID reports containing data items and an HID report descriptor describing the HID reports and the arrangement, formatting, and usage specifications of data items within the HID reports;
   an HID class driver to request and receive the HID reports and the HID report descriptor from the device driver; and a first interface function that is callable by a client program, the first interface function receiving a usage specification from the client program and in response finding and returning one or more data items from a specified HID report that have the same usage specifications as that received from the client program.

2. A computer system as recited in claim 1, wherein the first interface function additionally receives the specified HID report from the client program.

3. A computer system as recited in claim 1, wherein the first interface function additionally receives the specified HID report and a data structure from the client program, the data structure containing a parsed report description based on the HID report descriptor.

4. A computer system as recited in claim 1, wherein the first interface function additionally receives a collection identifier and in response limits the data items to those in an HID collection specified by the collection identifier.

5. A computer system as recited in claim 1, further comprising a second interface function that receives the HID report descriptor and in response returns a data structure containing a parsed report description, the first interface function additionally receiving said data structure and using said data structure to find said data items.

6. A computer system as recited in claim 1, further comprising a second interface function that receives the HID report descriptor from the client program and in response returns a data structure containing a parsed report description, the first interface function additionally receiving said data structure and using said data structure to find said data items.

7. A computer system as recited in claim 1, wherein the first interface function returns an error code if there is no data item with the received usage specification in the specified HID report, wherein the specified HID report was generated by a particular device, and wherein the error code indicates whether a control with the received usage specification is available on said particular device.

8. A computer system as recited in claim 1, further comprising:
a second interface function that receives the HID report descriptor from the client program and in response returns a data structure containing a parsed report description, the first interface function additionally receiving said data structure and using said data structure to find said data items;
wherein the first interface function returns an error code if there is no data item with the received usage specification in the specified HID report, wherein the specified HID report was generated by a particular device, and wherein the error code indicates whether a control with the received usage specification is available on said particular device.

9. A computer system as recited in claim 1, wherein the HID class driver is further configured to normalize HID reports from a particular HID device by making them a uniform size.

10. A computer system as recited in claim 1, wherein the HID class driver is further configured to normalize HID reports by adding a report ID to any HID report that does not already have a report ID and by making HID reports from a particular HID device a uniform size.

11. A computer system as recited in claim 1, wherein the received usage specification identifies a usage page, and wherein the returned data items comprise an array of usage indexes corresponding to HID buttons that are pressed regardless of whether the specified HID report contains index arrays or bit fields.

12. A computer system as recited in claim 1, wherein the returned data items include a plurality of HID values.

13. A computer system as recited in claim 1, further comprising a second interface function that returns an array of data structures specifying HID collections and their interrelationships based on the HID report descriptor.

14. A computer system as recited in claim 1, further comprising a second interface function that returns an array of data structures specifying HID collections and their interrelationships based on the HID report descriptor, wherein the first interface function additionally receives a collection identifier and in response finds the data items in an HID collection specified by the collection identifier.

15. A computer system as recited in claim 1, wherein the device driver also writes HID reports to HID devices, further comprising a second interface function that accepts a data item and a usage specification and in response positions and formats the data item in an HID report for writing to an HID device.

16. A computer-readable storage medium comprising computer-executable instructions that define a first interface function in a computer system having an HID device that provides HID reports containing data items and an HID report descriptor describing the HID reports and the arrangement, formatting, and usage specifications of data items within the HID reports; the first interface function receiving an HID report and a usage specification from a client program and in response finding and returning one or more data items from the HID report that have the same usage specifications as that received from the client program.

17. A computer-readable storage medium as recited in claim 16, wherein the first interface function additionally receives a parsed report description based on the HID report descriptor from the client program.

18. A computer-readable storage medium as recited in claim 16, wherein the first interface function additionally receives a collection identifier and in response limits the returned data items to those in an HID collection specified by the collection identifier.

19. A computer-readable storage medium as recited in claim 16, wherein the instructions define a second interface function that receives the HID report descriptor and in response returns a parsed report description, the first interface function additionally receiving said parsed report description and using said parsed report description to find said data items.

20. A computer-readable storage medium as recited in claim 16, wherein the first interface function returns an error code if there is no data item with the received usage specification in the received HID report, wherein the specified HID report was generated by a particular device, and wherein the error code indicates whether a control with the received usage specification is available on said particular device.

21. A computer-readable storage medium as recited in claim 16, wherein the instructions define a second interface function that receives the HID report descriptor and in response returns a data structure containing a parsed report description, the first interface function additionally receiving said data structure and using said data structure to find said data items;
wherein the first interface function returns an error code if there is no data item with the received usage specification in a specified HID report, wherein the specified HID report was generated by a particular device, and wherein the error code indicates whether a control with the received usage specification is available on said particular device.

22. A computer-readable storage medium as recited in claim 16, wherein the received usage specification identifies a usage page, and wherein the returned data items comprise an array of usage indexes corresponding to HID buttons that are pressed regardless of the received HID report contains index arrays or bit fields.

23. A computer-readable storage medium as recited in claim 16, wherein the returned data items include a plurality of HID values.

24. A computer-readable storage medium as recited in claim 16, wherein the instructions define a second interface function that returns an array of data structures specifying HID collections and their interrelationships based on an HID report descriptor.

25. A computer-readable storage medium as recited in claim 16, wherein the instructions define a second interface function that returns an array of data structures specifying HID collections and their interrelationships based on an HID report descriptor, wherein the first interface function additionally receives a collection identifier and in response limits the returned data items to those in an HID collection specified by the collection identifier.

26. A computer-readable storage medium as recited in claim 16, wherein the instructions define a second interface function that accepts a data item and a usage specification and in response positions and formats the data item in an HID report for writing to an HID device.

27. A method of reading HID data items comprising the following steps:
    obtaining an HID report descriptor describing associated HID reports and 1, the arrangement, formatting, and usage specifications of data items within such HID reports;
    submitting the HID report descriptor to a parser through an interface; the parser performing a step of parsing the HID report descriptor and returning a parsed report description based on the HID report descriptor;
    obtaining an HID report containing data items described by the HID report descriptor;
    calling a first interface function with arguments comprising the HID report, the parsed report description, and a usage specification; and
    the first interface function finding and returning one or more data items from the HID report that have the same usage specifications as that specified in the arguments to the first interface function.

28. A method as recited in claim 27, wherein the first interface function returns an error code if it cannot find said one or more data items in the HID report, the error code indicating whether a control with the usage specification is available in a report described by the HID report descriptor.

29. A method as recited in claim 27, further comprising a step of normalizing HID reports from a particular HID device by making them a uniform size.

30. A method as recited in claim 27, further comprising a step of normalizing HID reports by adding a report ID to any HID report that does not already have a report ID and by making HID reports from a particular HID device a uniform size.

31. A method as recited in claim 27, wherein the arguments to the first interface function comprise a collection identifier, the method comprising a further step of limiting the returned data items to those in an HID collection specified by the collection identifier.

32. A method as recited in claim 27, further comprising:
    calling a second interface function with an argument comprising the parsed report description;
    the second interface function returning an array of data structures specifying HID collections and their interrelationships;
    the first interface function arguments further comprising a collection identifier;
    the first interface function limiting the returned data items to those in an HID collection specified by the collection identifier.

33. A method as recited in claim 27, wherein the usage specification is a usage page, and wherein the returned data items include a plurality of HID values.

34. A method as recited in claim 27, wherein the usage specification is a usage page, and wherein the returned data items comprise an array of usage indexes corresponding to HID buttons that are pressed regardless of whether the HID report contains index arrays or bit fields.

35. A computer-readable storage medium comprising computer-executable instructions that define a set of interface functions that are callable in a computer system having an HID device that provides HID reports containing data items and an HID report descriptor describing the HID reports and the arrangement, formatting, and usage specifications of data items within the HID reports; the set of interface functions defined by the instructions comprising:
    a descriptor parsing function that receives a function argument comprising an HID report descriptor, and in response parses the HID report descriptor and returns a parsed report description based on the HID report descriptor; and
    one or more item retrieval functions that receive function arguments comprising an HID report, the parsed report description, and a usage specification; said one or more item retrieval functions finding and returning one or more data items from the HID report that have the same usage specifications as that supplied in the arguments to the item retrieval functions.

36. A computer-readable storage medium as recited in claim 35, the item retrieval functions comprising a button retrieval function, the usage specification including a usage page; wherein the button retrieval function returns an array of usage indexes corresponding to HID buttons that are pressed regardless of whether the HID report contains index arrays or bit fields.

37. A computer-readable storage medium as recited in claim 35, the item retrieval functions comprising a value retrieval function, the usage specification including a usage page and a usage index; wherein the value retrieval function returns an HID value corresponding to the usage specification.

38. A computer-readable storage medium as recited in claim 35, wherein the item retrieval function returns an array of HID values corresponding to the usage specification.

39. A computer-readable storage medium as recited in claim 35, the item retrieval functions comprising:
    a button retrieval function that returns an array of usage indexes corresponding to HID buttons that are pressed regardless of whether the HID report contains index arrays or bit fields;
    a value retrieval function that returns one or more HID values.

40. A computer-readable storage medium as recited in claim 35, the set of interface functions defined by the computer-executable instructions further defining a collection identification function that receives function arguments comprising the parsed report description and in response returns an array of data structures specifying HID collections and their interrelationships.

41. A computer-readable storage medium as recited in claim 35, the set of interface functions defined by the computer-executable instructions further defining a collection identification function that receives function arguments comprising the parsed report description and in response returns an array of data structures specifying HID collections and their interrelationships; wherein:

the arguments received by the item retrieval functions include an optional collection identifier;

the item retrieval functions limit the returned data items to those in an HID collection specified by the collection identifier when such a collection identifier is provided.

42. A computer-readable storage medium as recited in claim 35, the set of interface functions defined by the computer-executable instructions further defining one or more item write functions that receive function arguments comprising one or more data items and a usage specification; said one or more item write functions positioning and formatting said data items in an HID report for writing to an HID device.

43. A computer-readable storage medium as recited in claim 35, wherein the item retrieval functions are defined to receive HID reports that are normalized in size.

44. In an HID class driver that receives HID reports of different sizes from one or more HID devices, a method of returning HID reports to requesting client programs, comprising the following steps:

receiving HID reports from an HID device;

normalizing the HID reports from the HID device by making them a uniform size; and returning the normalized HID reports to requesting client programs.

45. A method as recited in claim 44, wherein the uniform size is at least as as the largest HID report generated by said HID device.

46. A method as recited in claim 44, wherein the normalizing step comprises adding a report ID to any HID report that does not already have a report ID.

47. A method as recited in claim 44, wherein:

the normalizing step comprises adding a report ID to any HID report that does not already have a report ID;

the uniform size is the size of the largest HID report generated by said HID device, including any added report ID.

48. A computer system comprising:

an HID driver that provides HID reports of different sizes from one or more HID devices;

an HID class driver configured to request and receive the HID reports from the HID driver and to return the HID reports in response to requests from client programs; and wherein the HID class driver normalizes HID reports from a particular HID device by making them a uniform size.

49. A computer system as recited in claim 48, wherein the uniform size is at least as large as the largest HID report generated by said particular HID device.

50. A computer system as recited in claim 48, wherein the normalization includes adding a report ID to any HID report that does not already have a report ID.

51. A computer system as recited in claim 48, wherein:

the normalization includes adding a report ID to any HID report that does not already have a report ID;

the uniform size is the size of the largest HID report generated by said particular HID device, including any added report ID.

52. A computer-readable storage medium comprising instructions that implement an HID class driver, the instructions being executable by a computer to perform the following steps:

receiving HID reports from one or more HID devices;

adding a report ID to any HID report that doesn't already have a report ID;

normalizing HID reports from a particular HID device by making them a uniform size; and returning the normalized HID reports to requesting client programs.

53. A computer-readable storage medium as recited in claim 52, wherein the uniform size is at least as large as the largest HID report generated by said particular HID device.

54. A computer-readable storage medium as recited in claim 52, wherein the normalizing step comprises adding a report ID to any HID report that does not already have a report ID.

55. A computer-readable storage medium as recited in claim 52, wherein:

the normalizing step comprises adding a report ID to any HID report that does not already have a report ID;

the uniform size is the size of the largest HID report generated by said particular HID device, including any added report ID.

* * * * *

UNITED STATES PATENT AND TRADEMARK OFFICE
CERTIFICATE OF CORRECTION

PATENT NO.    : 6,311,228 B1
DATED         : October 30, 2001
INVENTOR(S)   : Ray It is certified that error appears in the above-identified patent and that said Letters Patent is hereby corrected as shown below:

Column 7,
Line 40, replace "computer'processor" with -- computer's processor --.

Column 8,
Line 66, delete "11" between "items" and "corresponding".

Colunm 9,
Line 33, replace "re port" with -- report --.

Column 10,
Line 59, replace "arc" with -- are --.

Column 11,
Line 1, replace "program'perspective" with -- program's perspective --.
Line 2, replace "arc" with -- are --.

Column 15,
Line 44, replace "HiD" with -- HID --.
Line 55, delete "24" between "set" and "other".

Column 16,
Line 1, replace "mini lass drive r" with -- miniclass driver --.

Column 17,
Line 20, replace "HID" with -- HiD --.

Column 18,
Line 49, insert -- HIDP_STATUS_INCOMPATIBLE_REPORT_ID or -- between "is" and "HIDP_".

Column 26,
Line 29, replace "HidP GetValueCaps." with -- HidP_Get --.

Column 28,
Line 24, replace "arc" with -- are --.

UNITED STATES PATENT AND TRADEMARK OFFICE
CERTIFICATE OF CORRECTION

PATENT NO. : 6,311,228 B1
DATED : October 30, 2001
INVENTOR(S) : Ray

It is certified that error appears in the above-identified patent and that said Letters Patent is hereby corrected as shown below:

Column 29,
Line 19, replace "N" with -- IN --.
Line 26, replace "Specifics" with -- Specifies --.

Column 31,
Line 33, replace "Usage Value" with -- UsageValue --.

Column 32,
Line 11, replace "Specifics" with -- Specifies --.
Line 50, insert -- IN -- before "HIDP".
Line 51, insert -- IN -- before "USAGE".

Column 33,
Line 5, replace "specifics" with -- specifies --.
Line 59, replace "Usage Value" with -- UsageValue --.

Column 36,
Line 3, replace "linkCollection," with -- LinkCollection, --.

Column 37,
Line 22, replace "Usage ValueByteLength," with -- UsageValueByteLength, --.

Column 40,
Line 34, delete "," after "string".

Column 42,
Line 36, replace "pace" with -- page --.

Column 44,
Line 49, replace "Specifics" with -- Specifies --.
Line 57, replace "Not Range" with -- NotRange --.

Column 45,
Line 50, replace "Not Range" with -- NotRange --.
Line 61, replace "HidP_GetSpecificValueCap'to" with
-- Hidp_GetSpecificValueCap's to --.

UNITED STATES PATENT AND TRADEMARK OFFICE
CERTIFICATE OF CORRECTION

PATENT NO.    : 6,311,228 B1
DATED         : October 30, 2001
INVENTOR(S)   : Ray It is certified that error appears in the above-identified patent and that said Letters Patent is hereby corrected as shown below:

Column 47,
Line 17, replace "arc" with -- are --.

Column 48,
Line 43, delete "Is" after "used,".

Column 49,
Line 24, replace "2.2" with -- 12.2 --.
Line 25, delete "Is" before "All".

Column 51,
Line 59, start a new paragraph after "Block".

Column 55,
Line 33, delete "1" between "and" and "the".

Column 57,
Line 40, insert -- large -- between "as" and "as".

Signed and Sealed this

Eighteenth Day of March, 2003

JAMES E. ROGAN
*Director of the United States Patent and Trademark Office*